(12) United States Patent
Haque et al.

(10) Patent No.: US 12,245,138 B2
(45) Date of Patent: Mar. 4, 2025

(54) METHODS FOR CELL (RE-) SELECTION WITH ZERO-ENERGY (ZE) RADIO RECEIVERS

(71) Applicant: INTERDIGITAL PATENT HOLDINGS, INC., Wilmington, DE (US)

(72) Inventors: Tanbir Haque, Jackson Heights, NY (US); Hussain E. Elkotby, Conshohocken, PA (US); Ravikumar V. Pragada, Warrington, PA (US); Patrick Cabrol, Bayshore, NY (US); Anantharaman Balasubramanian, San Diego, CA (US); Marian Rudolf, Montreal (CA); William E. Lawton, Pottstown, PA (US); Muhammad U. Fazili, Audubon, PA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 464 days.

(21) Appl. No.: 17/414,159

(22) PCT Filed: Dec. 17, 2019

(86) PCT No.: PCT/US2019/066755
§ 371 (c)(1),
(2) Date: Jun. 15, 2021

(87) PCT Pub. No.: WO2020/131813
PCT Pub. Date: Jun. 25, 2020

(65) Prior Publication Data
US 2022/0070766 A1 Mar. 3, 2022

Related U.S. Application Data

(60) Provisional application No. 62/886,103, filed on Aug. 13, 2019, provisional application No. 62/780,639, filed on Dec. 17, 2018.

(51) Int. Cl.
*H04W 52/02* (2009.01)
*H04W 24/08* (2009.01)
*H04W 48/18* (2009.01)

(52) U.S. Cl.
CPC .......... *H04W 48/18* (2013.01); *H04W 24/08* (2013.01); *H04W 52/0209* (2013.01); *H04W 52/0229* (2013.01); *H04W 52/0274* (2013.01)

(58) Field of Classification Search
CPC ..... H04W 48/18; H04W 24/08; H04W 36/08; H04W 52/0229; H04W 52/0274;
(Continued)

(56) References Cited

U.S. PATENT DOCUMENTS

| 10,904,053 B2 | 1/2021 | Lim et al. |
| 11,452,036 B2 | 9/2022 | Zhou et al. |

(Continued)

FOREIGN PATENT DOCUMENTS

| CN | 108632959 B | 10/2020 | |
| WO | 2019/108940 | 6/2019 | |
| WO | WO-2019108940 A1 * | 6/2019 | ........... H04B 7/0404 |

OTHER PUBLICATIONS

Haque, "Air-Interfaces for Ultra-Low Power Communications—Challenges, Solutions and Potential Benefits," 6G Summit, Levi, Finland (Mar. 2019).

(Continued)

*Primary Examiner* — Lakeram Jangbahadur
(74) *Attorney, Agent, or Firm* — Volpe Koenig

(57) ABSTRACT

Approaches for idle mode operations for wireless transmit/receive units (WTRUs) with zero-energy (ZE) receivers are disclosed herein. A WTRU operating in idle mode, may receive using the main transceiver over a Uu interface, an energy harvesting (EH) configuration for use over a ZE air interface. The main transceiver may be turned off, and the (Continued)

ZE receiver as part of a ZE idle mode operation, may detect, over the ZE air interface, and harvest energy from ZE reference signals. The WTRU may calculate an amount of energy harvested from the ZE reference signals over a first time period. The WTRU may calculate a ZE idle mode operation energy consumption over the first time period. On a condition that the ZE idle mode operation energy consumption is greater than the harvested energy, the main transceiver may be turned on and the WTRU may enter a Uu interface idle mode operation.

14 Claims, 20 Drawing Sheets

(58) Field of Classification Search
CPC . H04W 48/20; H04W 88/06; H04W 52/0209; Y02D 30/70; H02J 50/001
See application file for complete search history.

(56) References Cited

U.S. PATENT DOCUMENTS

| | | | |
|---|---|---|---|
| 2014/0286280 A1* | 9/2014 | Seo | H04B 7/0626 370/329 |
| 2015/0091706 A1* | 4/2015 | Chemishkian | G06K 7/10158 340/10.34 |
| 2015/0303741 A1 | 10/2015 | Malik et al. | |
| 2017/0214567 A1* | 7/2017 | Salkintzis | H04L 43/16 |
| 2020/0314752 A1 | 10/2020 | Haque et al. | |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Third Generation Partnership Project, "Technical Specification Group Core Network and Terminals; Non-Access-Stratum (NAS) functions related to Mobile Station (MS) in idle mode (Release 15)," 3GPP TS 23.122 V15.5.0 (Sep. 2018).

Third Generation Partnership Project, "Technical Specification Group Core Network and Terminals; Non-Access-Stratum (NAS) functions related to Mobile Station (MS) in idle mode (Release 15)," 3GPP TS 23.122 V15.7.0 (Mar. 2019).

Third Generation Partnership Project, "Technical Specification Group Core Network and Terminals; Non-Access-Stratum (NAS) functions related to Mobile Station (MS) in idle mode (Release 16)," 3GPP TS 23.122 V16.3.0 (Sep. 2019).

Third Generation Partnership Project, "Technical Specification Group Radio Access Network; Evolved Universal Terrestrial Radio Access (E-UTRA); User Equipment (UE) procedures in idle mode (Release 15)," 3GPP TS 36.304 V15.1.0 (Sep. 2018).

Third Generation Partnership Project, "Technical Specification Group Radio Access Network; Evolved Universal Terrestrial Radio Access (E-UTRA); User Equipment (UE) procedures in idle mode (Release 15)," 3GPP TS 36.304 V15.4.0 (Jun. 2019).

Third Generation Partnership Project, "Technical Specification Group Radio Access Network; NR; User Equipment (UE) procedures in Idle mode and RRC Inactive state (Release 15)," 3GPP TS 38.304 V15.1.0 (Sep. 2018).

Third Generation Partnership Project, "Technical Specification Group Radio Access Network; NR; User Equipment (UE) procedures in Idle mode and RRC Inactive state (Release 15)," 3GPP TS 38.304 V15.5.0 (Sep. 2019).

Qualcomm Incorporated, "Efficient monitoring of DL control channels," 3GPP TSG RAN WG1 Meeting #92bis, R1-1804914, Sanya, China (Apr. 16-20, 2018).

* cited by examiner

METHODS FOR CELL (RE-) SELECTION WITH ZERO-ENERGY (ZE) RADIO RECEIVERS

CROSS-REFERENCE TO RELATED APPLICATIONS

This application is the U.S. National Stage, under 35 U.S.C. § 371, of International Application No. PCT/US2019/066755, filed Dec. 17, 2019, which claims the benefit of U.S. Provisional Application No. 62/780,639, filed on Dec. 17, 2018, and 62/886,103, filed Aug. 13, 2019, the contents of which are incorporated herein by reference.

BACKGROUND

A passive receiver or zero-energy (ZE) receiver is a type of radio frequency (RF) circuitry that can process received RF waveforms in absence of an active power supply. For example, such a device may harvest energy from the received RF waveform to run the necessary circuitry to process received signals. A passive receiver may use RF components such as cascading capacitors, zero-bias Schottky diodes and/or microelectromechanical system (MEMS) to implement the functionality required for voltage multipliers or rectifiers, charge pumps and signal detectors. Accordingly, when the passive receiver is used in a user device, the reduction in power consumption may be considerable. For example, the power consumption in the user device can be reduced to less than 1 mW while the user device stays in idle mode.

The user device equipped with the passive receiver may receive a paging message or wake-up signal when it is in idle mode. Thus, the user device equipped with the passive receiver is expected to support cell measurement or cell (re-)selection without incurring costly power consumption. However, existing cell measurement or cell (re-)selection procedures typical for cellular networks are not suitable when it is applied to the user device equipped with the passive receiver. Thus, methods and apparatuses that allow user devices to efficiently perform the cell measurements and cell (re-)selection in combination with tracking area update procedures are needed.

SUMMARY

Approaches for idle mode operations for wireless transmit/receive units (WTRUs) with zero-energy (ZE) receivers are disclosed herein. A WTRU operating in idle mode, may receive using the main transceiver over a Uu interface, an energy harvesting (EH) configuration for use over a ZE air interface. The main transceiver may be turned off, and the ZE receiver as part of a ZE idle mode operation, may detect, over the ZE air interface, and harvest energy from ZE reference signals. The WTRU may calculate an amount of energy harvested from the ZE reference signals over a first time period. The WTRU may calculate a ZE idle mode operation energy consumption over the first time period. On a condition that the ZE idle mode operation energy consumption is greater than the harvested energy, the main transceiver may be turned on and the WTRU may enter a Uu interface idle mode operation.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
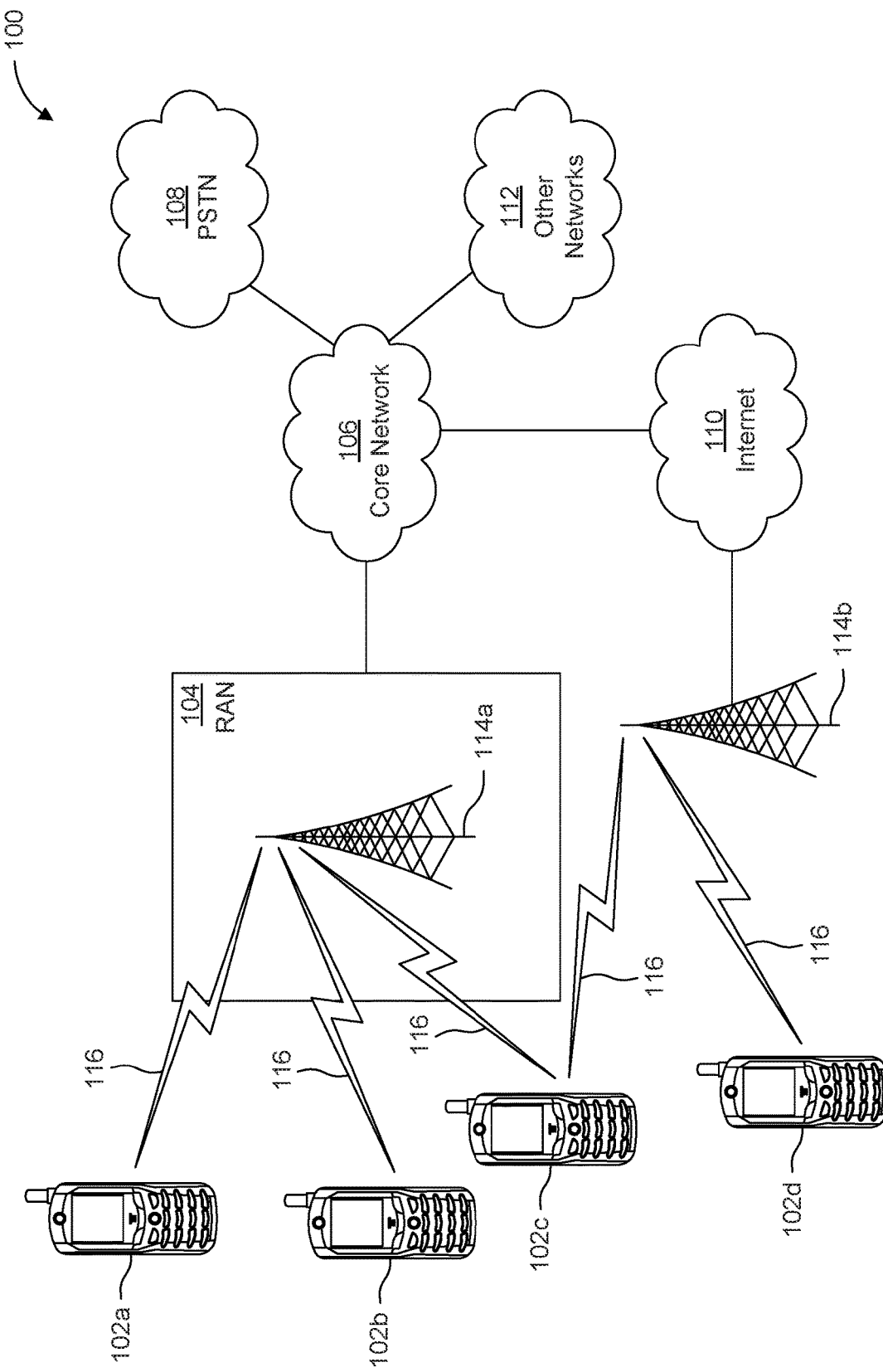
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
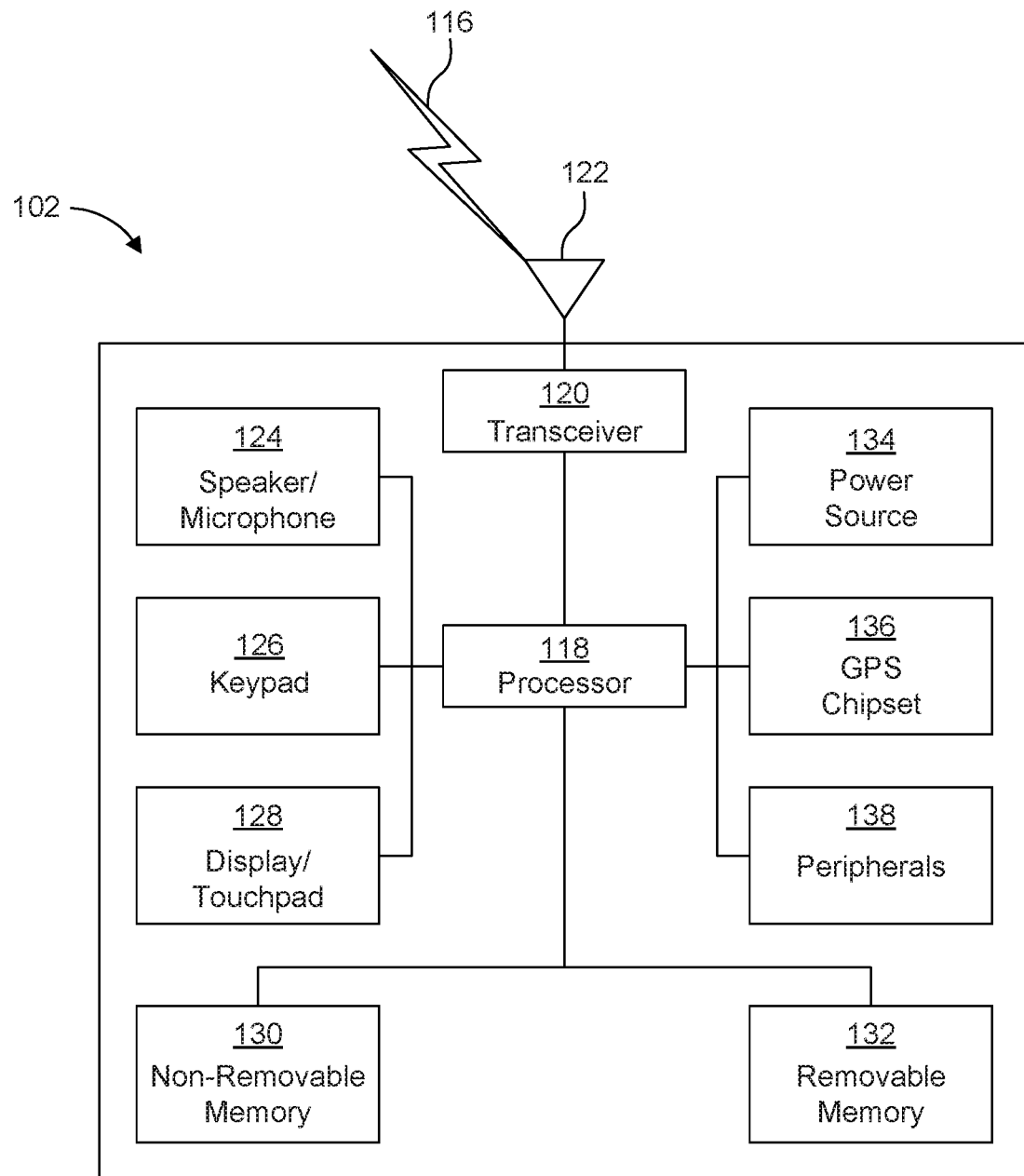
FIG. 1B is a system diagram illustrating an example wireless transmit/receive unit (WTRU) that may be used within the communications system illustrated in FIG. 1A according to an embodiment.
Figure 1C:
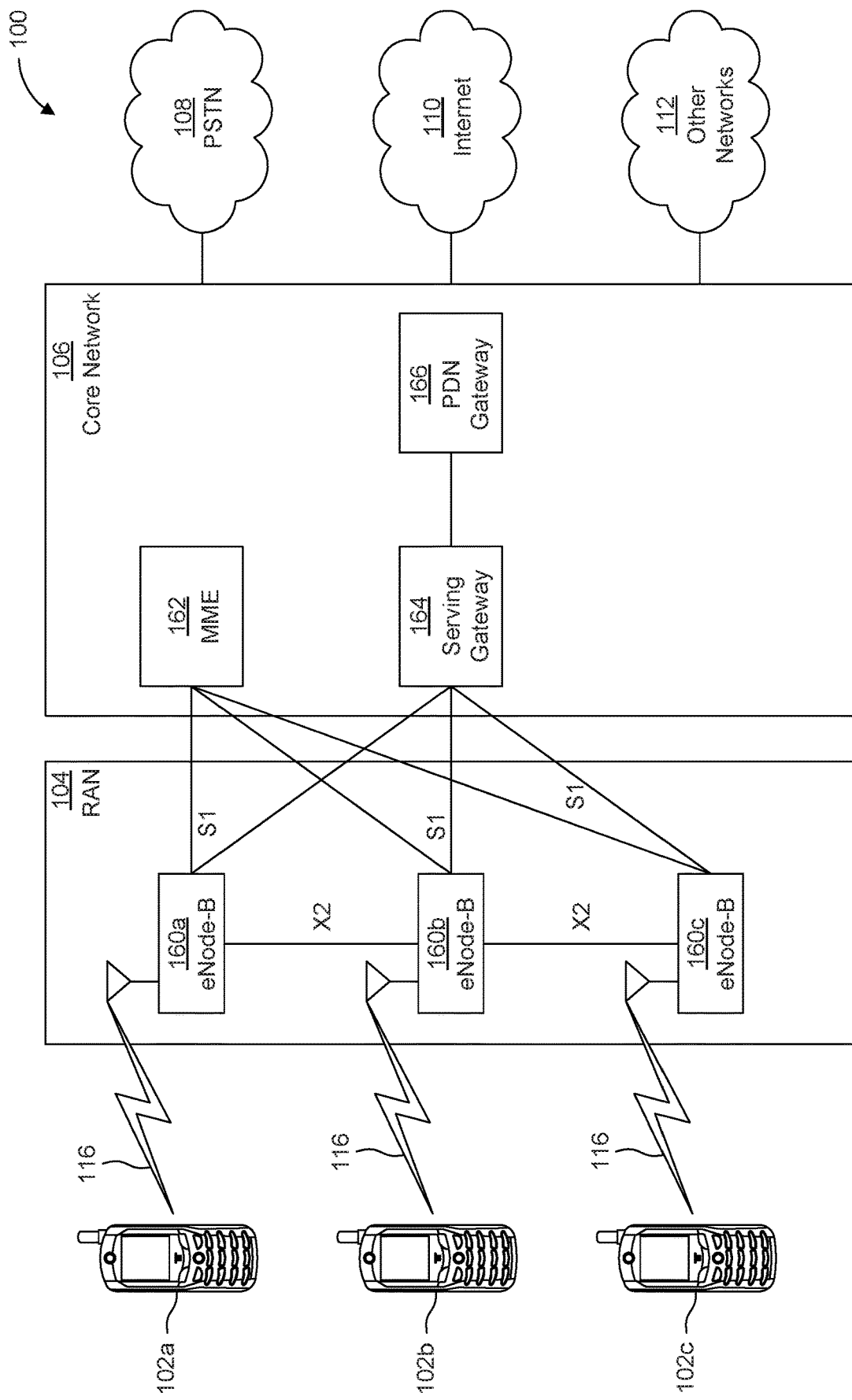
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip. Although it not shown in FIG. 1B, the transceiver 120 may comprise a passive transceiver (or a passive receiver) and a main transceiver (or a main receiver) that are operatively coupled to the processor 118 and the transmit/receive element 122.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 10:
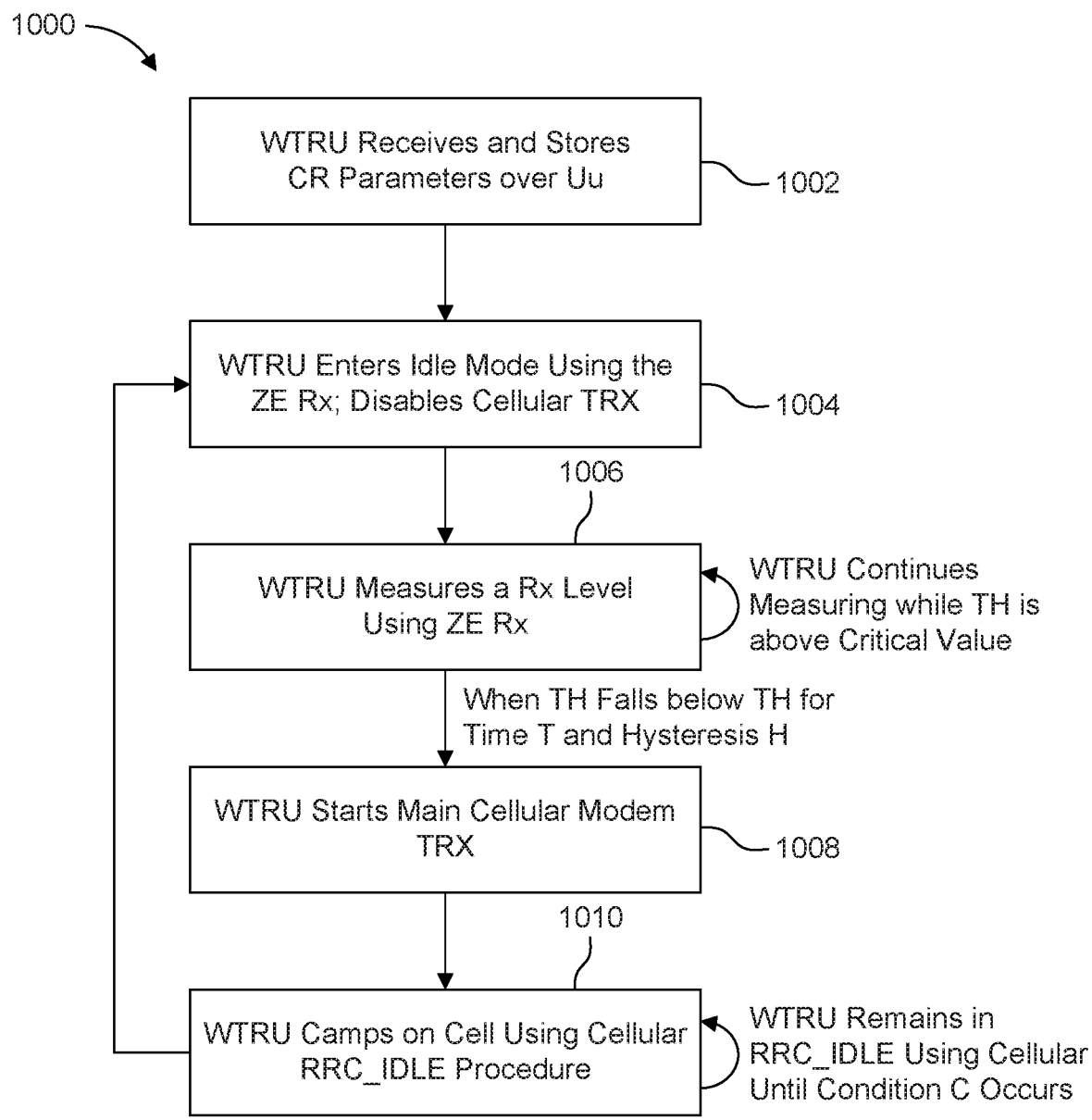
FIG. 10 shows a flow diagram of an example WTRU autonomous fallback procedure for idle mode operation using a passive receiver.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
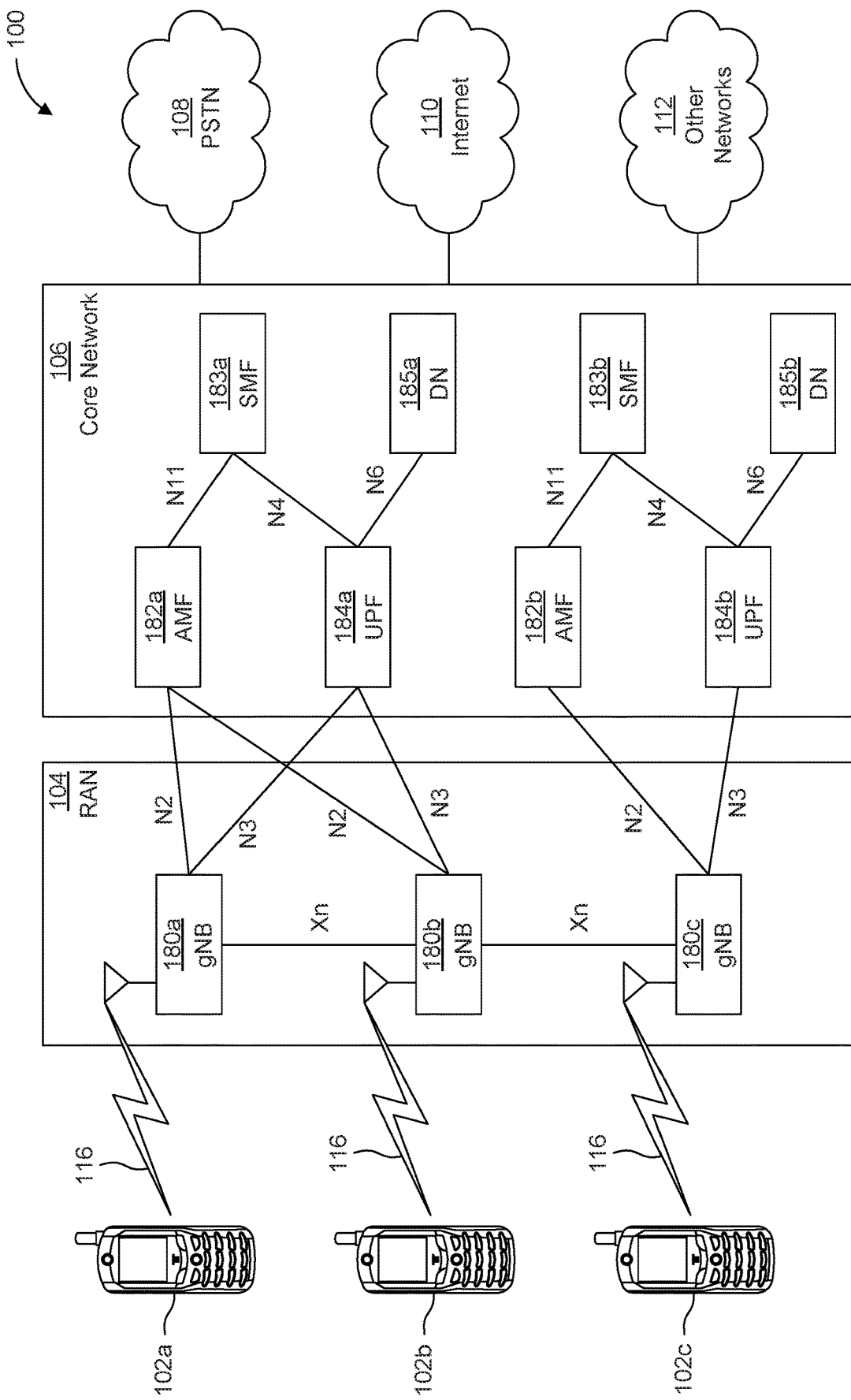
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In state-of-the-art wireless technology such as cellular and WLAN, RF front-ends may be a mix of passive and active components. For example, passive components may include receive (Rx) antennas, transmit/receive (Tx/Rx) path switches, and/or filters. These passive components may need little if any power in order to function. In contrast, active components need power in order to function. For example, the oscillator to tune to the carrier frequency, the low noise amplifier and the analog-to-digital (A/D) converters in the Rx path are active components.

Advances in RF component design over the last years have made it possible to use a type of RF circuitry such as a passive receiver (ZE receiver) that can process received RF waveforms which are collected through the antenna front-end by the receiving device in absence of an active power supply. For example, a equipped with a passive receiver may harvest energy from the received RF waveform to run the necessary circuitry to process signals. These passive receivers may use RF components such as cascading capacitors, zero-bias Schottky diodes, microelectromechanical system (MEMS), to implement the functionality required for voltage multipliers or rectifiers, charge pumps and signal detectors. With these RF components, the passive receivers may operate in the antenna far-field and support large link budgets. These features enable reception of radio signals by passive receivers over significant distances.

Unlike passive receivers, radio-frequency identification (RFID) and near field communication (NFC) technologies in low frequency (LF) and high frequency (HF) bands operate in the near-field region of the reader antenna. RFID or NFC tags and reader antennas are separated by a small percentage of the carrier wavelength. Thus, for these technologies, communication is possible over small distances only. In the near-field region, the RFID or NFC tag is closely-coupled with the transmitter on the reader. The tag then modulates the electromagnetic (EM) field produced by the reader through changing the impedance value that the tag represents to the transmitting reader antenna. By switching between lower and higher relative impedance loads, the tag produces a change that the reader detects in turn. At ultra-high frequency (UHF) and even higher frequencies, the tag is more than one radio wavelength away from the reader, requiring a different approach. Backscattering may be used by the tag to modulate the signal.

Passive receivers can perform basic signal detection such as correlation for a known signature waveform and/or they can be put into energy harvesting mode by accumulating energy from the RF waveform entering the receiver front-end through the Rx antenna. Link budgets characteristic of small or medium area cellular base stations may be supported. For example, passive receivers can be used as wake-up radios (WUR) to trigger device internal wake-up and signal interrupts following the detection of wake-up signaling, which then prompts the main modem receiver (primary connectivity radio, PCR) using active RF components to start up. Herein, the terms passive receiver, passive transceiver, ZE receiver, ZE transceiver, wake-up receiver, wake-up transceiver, companion receiver, companion radio, and wake-up radio may be used interchangeably. Herein, the terms main receiver, main transceiver, main modem receiver, and primary connectivity radio (PAR or PCR) may be used interchangeably.

The reduction in WTRU power consumption is considerable when passive receivers are used. A typical cellular 3G, 4G or 5G modem transceiver may easily use up to a few hundred mWs in order to demodulate and process received signals during active reception such as in connected mode (e.g., RRC_CONNECTED). Power consumption typically scales with the number of RF front-end chains active on the WTRU, the channel bandwidth used for reception and the received data rate. When the WTRU is in RRC_IDLE mode with no data being received or transmitted, cellular radio power saving protocols such as discontinuous reception (DRX) or enhanced DRX (eDRX) ensure that the receiver only needs to be powered on a few times per second at most. The WTRU may then perform tasks, such as measuring the received signal strength of the serving and/or neighboring cells for the purpose of cell (re-)selection procedures and reception of paging channels. In addition, the WTRU may performs automatic frequency control (AFC) and channel estimation in support of coherent demodulation. In these cases, WTRU power consumption when in idle mode (e.g., RRC_IDLE) may be on the order of several mWs. In R15 enhanced machine-type-communication (eMTC) and narrowband Internet of Things (NB-IoT) cases, sequence detection circuitry for processing of in-band wake-up signals in RRC_IDLE mode may also be implemented in the form of a dedicated wake-up receiver or passive receiver. This allows the powering down of the A/D converters and significant parts of the digital baseband processor. However, several active components in the RF front-end, such as low-noise amplifiers and oscillators, are still used. With the passive receiver, WTRU power consumption in idle mode (e.g., RRC_IDLE) may be reduced to, for example, about 1 mW.

WTRUs implementing one or any combination of 2G, 3G, 4G and/or 5G radio access technologies (RATs) may perform public land mobile network (PLMN) selection, cell selection/re-selection and location registration procedures while in RRC_IDLE mode. Depending on capabilities, some devices (WTRUs) may also support manual closed subscriber group (CSG) selection or multimedia broadcast multicast service (MBMS) frequency prioritization in RRC_IDLE mode. 5G devices (WTRUs) may support RAN-level notification area (RNA) updates and operation in RRC_INACTIVE state.

When a WTRU is switched on, a PLMN is selected by the WTRU. For the selected PLMN, associated RAT(s) may be set. With cell selection, the WTRU searches for a suitable cell of the selected PLMN, chooses that cell to provide available services, and monitors its control channel. The WTRU may register its presence by means of a NAS registration procedure in the tracking area of the chosen cell.

While in RRC_IDLE, a WTRU performs received signal strength measurements on serving and/or neighboring cells. If the WTRU finds a more suitable cell according to the cell reselection criteria, it may reselect onto that cell and camp on it. If this new cell does not belong to at least one tracking area (TA) to which the WTRU is registered, location registration may be performed. The WTRU may also search for higher priority PLMNs at regular time intervals and search for a suitable cell if another PLMN has been selected by its non-access stratum (NAS).

If a WTRU loses coverage of the registered PLMN, either a new PLMN is selected automatically or an indication of available PLMNs is given to the WTRU (user) so that a manual selection can be performed. Various means of control may exist for the network to prioritize cell selection onto certain RATs, to control the rate at which low, medium or high mobility WTRUs perform cell re-selection, and to bar selected tracking areas from re-selection by WTRUs.

When the WTRU camps on a cell in RRC_IDLE state or in RRC_INACTIVE state, the WTRU may perform any of the following actions: receive system information (e.g., system information block (SIB)) from the PLMN; establish an RRC connection or resume a suspended RRC connection; and/or receive earthquake & tsunami warning system (ETWS) or commercial mobile alert system (CMAS) notifications. Moreover, if the network needs to send a control message or deliver data to a registered WTRU, it knows in most cases the set of tracking areas in which the WTRU is camped. A paging message can then be sent to the WTRU on the control channels of all the cells in the corresponding set of areas. The WTRU may then receive the paging message and can respond to the paging message.

A WTRU equipped with and operating a passive receiver in addition to its main receiver may benefit from near zero power consumption when the WTRU is not actively performing transmission or reception for the purpose of exchanging data and control signaling with the network. Given that WTRUs are mobile, the network tracks the approximate location of WTRUs implementing a passive receiver at least at the tracking area level. Transmission of paging messages and wake-up signaling may require use of DL transmission resources by the network in terms of power, spectrum resources, and/or time resources, therefore creating DL interference and reducing DL system capacity. If paging and wake-up signaling were to be transmitted to a WTRU over entire PLMNs or significant parts of their geographical coverage not knowing the whereabouts of the WTRU, the use of DL transmission resources would quickly become prohibitively large. Thus, mechanisms disclosed herein enable a WTRU implementing a passive receiver to support cell (re-)selection in idle mode and in combination with tracking area update procedure(s).

WTRUs implementing a passive receiver may also be expected to shut down all or significant parts of the main cellular modem receiver while operating in idle mode (e.g., RRC_IDLE and/or RRC_INACTIVE modes). When paging or wake-up signaling is transmitted by the network to the passive receiver in the WTRU, it may be necessary for the WTRU to turn on its main modem transceiver which may incur a significant time delay, and may be costly in terms of battery power consumption. For example, cold start delays may result from the WTRU determining a cell to camp on during initial cell selection, which may include measuring many different frequencies and operating bands over prolonged periods of time even if a PLMN is already preselected. Thus, mechanisms disclosed herein enable a WTRU implementing a passive receiver to support cell (re-)selection in order to dramatically reduce start up times and power consumption to start their main modem transceiver.

Existing cell (re-)selection procedures for cellular networks are unsuitable in their present form when applied to WTRUs equipped with passive receivers. For example, no DL signal to perform a signal strength measurement as input to the cell selection criteria evaluation exists for a passive receiver. For example, channel specific reference signal (CRS) are used in LTE, and synchronization signal blocks (SSBs) are used in NR. In their present form these DL signals do not enable energy-accumulation for a passive receiver to perform a measurement. In another example, passive receiver DL waveforms usually allow for a configurable and controllable trade-off between energy-harvesting and/or information bearing signal characteristics. The peak-to-average power ratio (PAPR) of the passive receiver DL waveform may be set deliberately high for the purpose of allowing passive receivers to accumulate energy. The notion of a received signal strength metric can therefore not be applied (as done for DL reference signals in LTE or NR) where DL reference signals are usually transmitted with equal RF power and constant-envelope properties. In another example, the cell re-selection evaluation process in existing technology assumes deterministic and known DL transmission settings for the DL reference signals transmitted by neighboring cells such that these different cells can be directly compared to each other even when accounting for various adjustment factors. This assumption may not hold true when using waveforms suitable for a passive receiver.

In view of these considerations, methods and apparatuses disclosed herein are designed to enable WTRUs with passive receivers to perform cell measurements, cell (re-)selection procedures, and tracking area update procedures in a manner suitable to the particular needs and characteristics of passive receiver technology.

As used herein, a WTRU equipped with a passive receiver may refer to multi-mode RAT device supporting one or any combination of the following technologies: 2G GSM/EGPRS, 3G WCDMA/HSPA, 4G LTE/eMTC/NB-IoT, 5G NR, or any other wireless standard. A WTRU equipped with a passive receiver devices may also include Wi-Fi, Bluetooth, GPS, or other communication technology. In an example, the passive receiver in a WTRU may operate in-band and/or on a dedicated band. In-band operation may refer to ZE signaling for passive receivers carried inside or in a portion of an operating band/frequency channel where the main modem receiver also operates. For example, both ZE signals and main radio air (e.g., Uu) interface signals may be transmitted in a 20 MHz channel (e.g., in LTE/NR band 1). Dedicated band operation may refer to ZE signaling carried in a frequency channel distinct from the main modem cellular downlink (DL) or uplink (UL) operating band/frequency channel. For example, ZE signaling may be transmitted in a 1 MHz wide portion of the 700 MHz band, while the main modem receiver operates in a 20 MHz wide channel (e.g., of LTE/NR band 1).

Examples mechanisms disclosed herein describe how to derive meaningful measurement quantities suitable to the particular nature of the ZE waveforms requiring RF energy harvesting for decoding. Examples mechanisms disclosed herein describe how to make a WTRU using a passive receiver work as multi-RAT device in presence of the cellular cell re-selection procedures.

Figure 2:
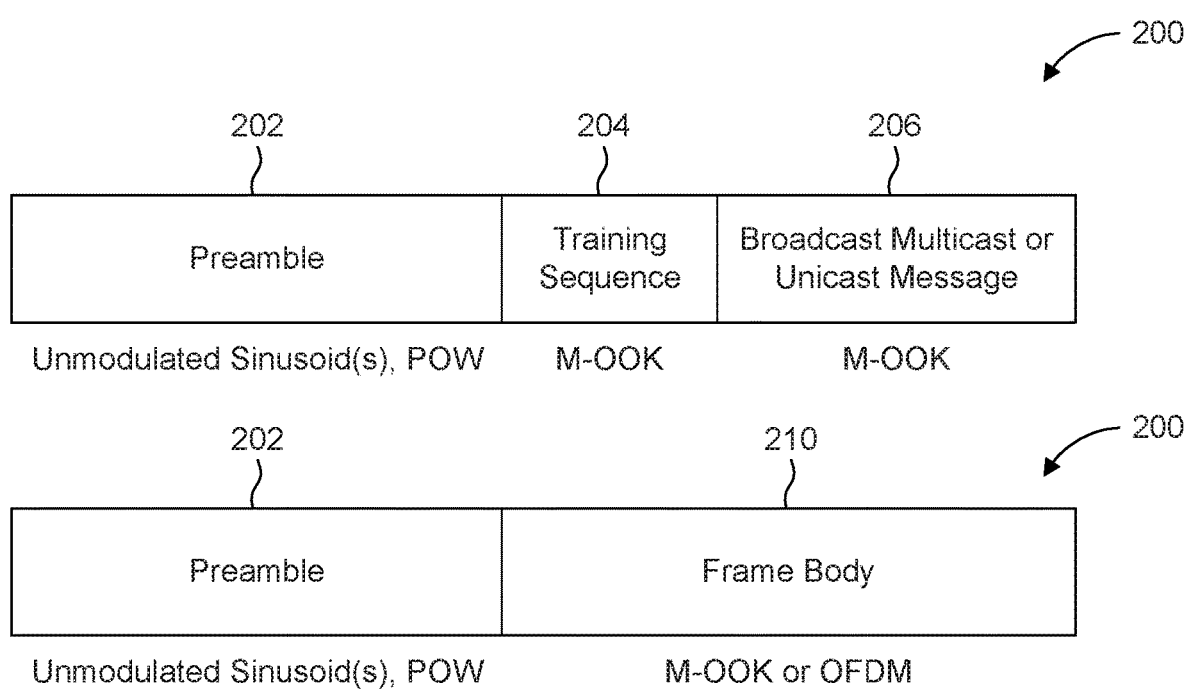
FIG. 2 shows a frame format diagram of an example ZE signal frame format.
Figure 3:
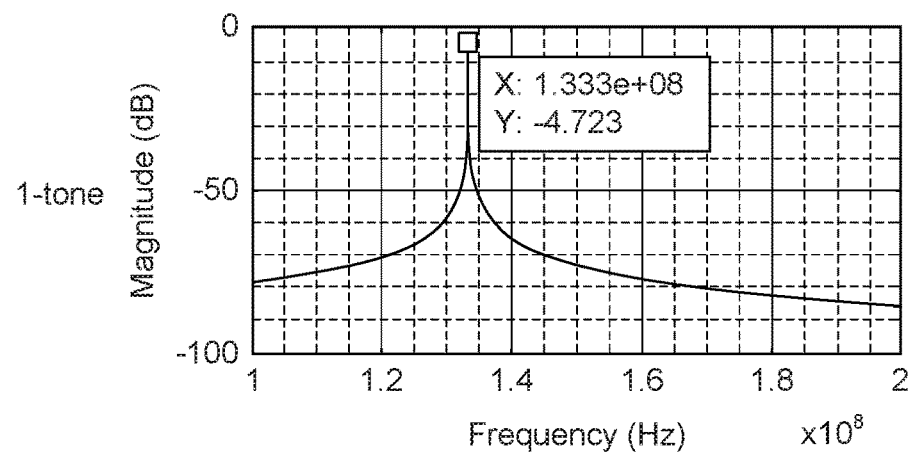
FIG. 3 shows graphs of example multi-tone transmission for power-optimized waveforms (POWS) with 1-tone, 4-tones, and 8-tones according to the frame format in FIG. 2.
Figure 3:
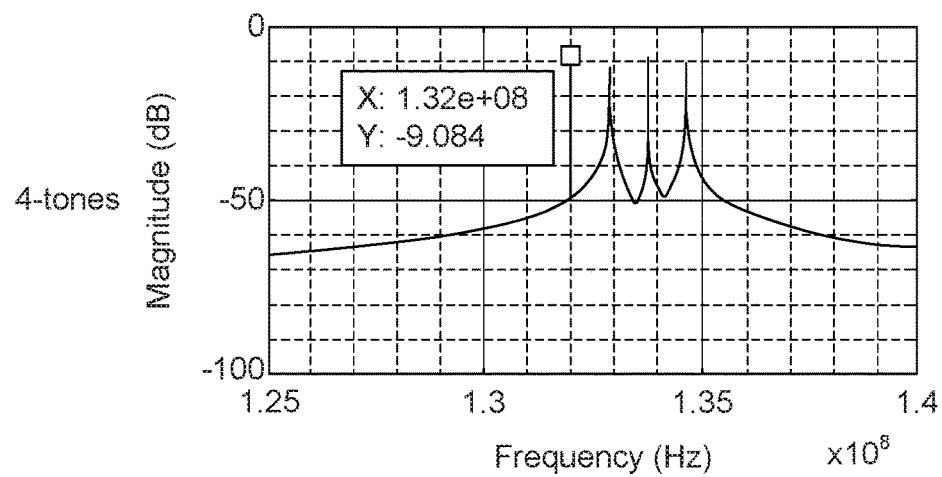
Figure 3:
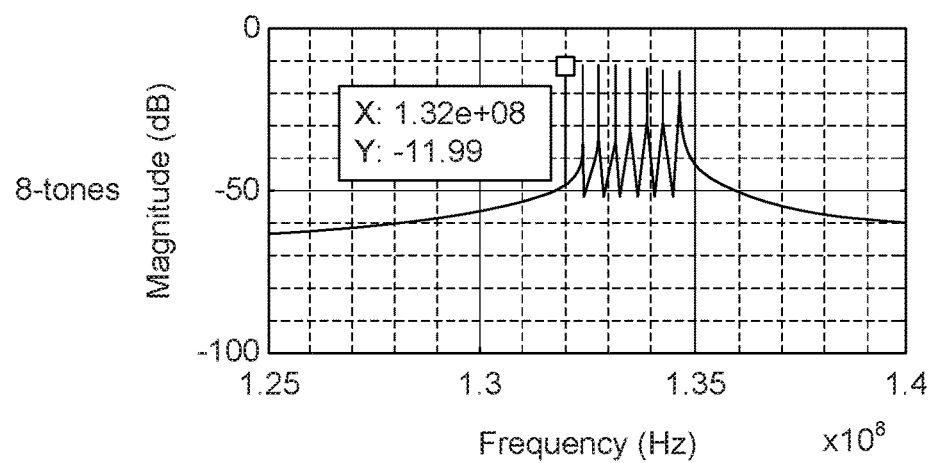

FIG. 2 shows a frame format diagram of an example ZE signal frame format 200. As illustrated in FIG. 2, a passive receiver in a WTRU may process a transmitted ZE waveform comprised of one or more power-optimized waveform part(s) and signaling part(s). For example, transmission of a power-optimized waveform (POW) part may be done by means of a preamble part 202 where selected sinusoid(s) or multi-tone transmissions are sent over a portion of a frequency spectrum. FIG. 3 shows graphs of example multi-tone transmission for power-optimized waveforms (POWS) with 1-tone, 4-tones, and 8-tones according to the frame format 200 in FIG. 2. A frame body 210 (which may include, for example, a training sequence 204 and/or a broadcast/multicast/unicast message or payload 206) may be transmitted using a modulation or multiplexing scheme. Examples modulation or multiplexing scheme for transmitting the frame body 210 may include, but are not limited to include, any of the following schemes: on-off keying (OOK), multilevel on-off keying (M-OOK), frequency-shift keying (FSK), bi-phase-shift keying (BPSK), quadrature-phase-shift keying (QPSK) and TDMA, FDMA, CDMA or OFDM. The frame body 210 may be used by the passive receiver to determine and process the control signaling and/or data signaling. ZE waveforms may be used by the WTRU, using the passive receiver, to determine channel state and/or reception conditions.

Figure 4:
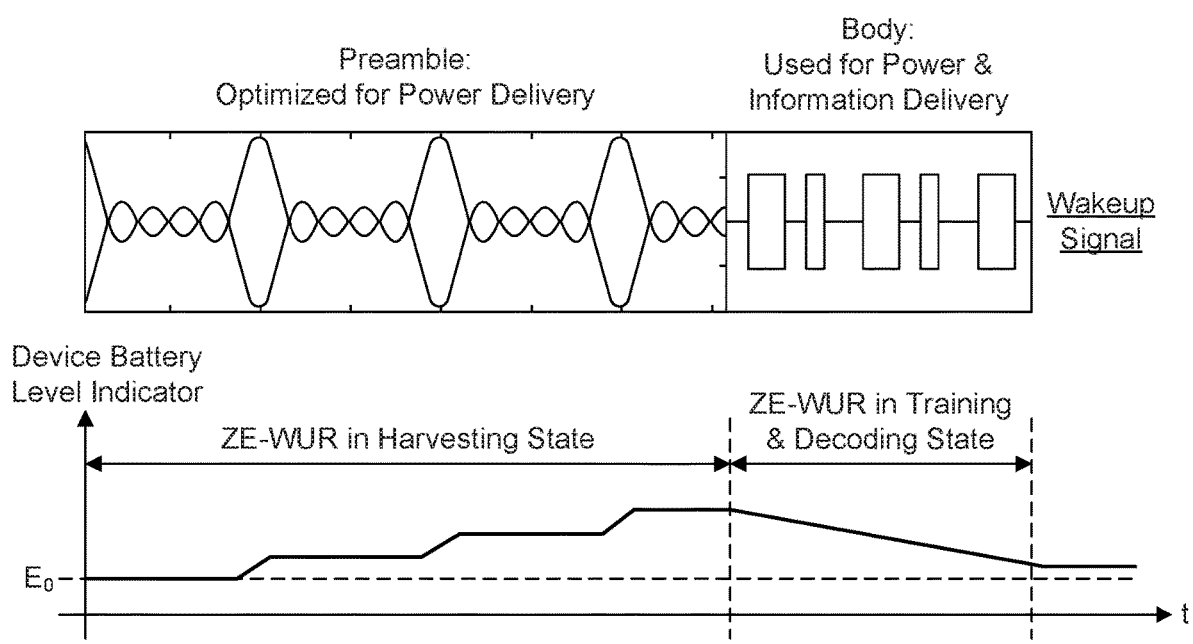
FIG. 4 shows graphs of an example ZE (wakeup) signal structure and corresponding energy-harvesting profile at the WTRU that receives the ZE signal.
Figure 5:
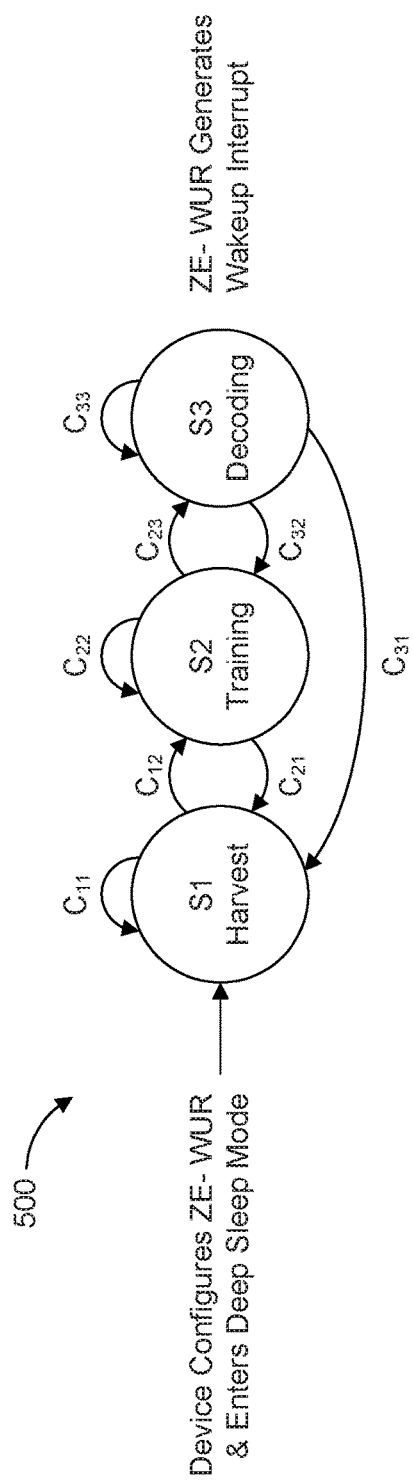
FIG. 5 shows a state diagram of an example state machine of a ZE receiver.
Figure 6:
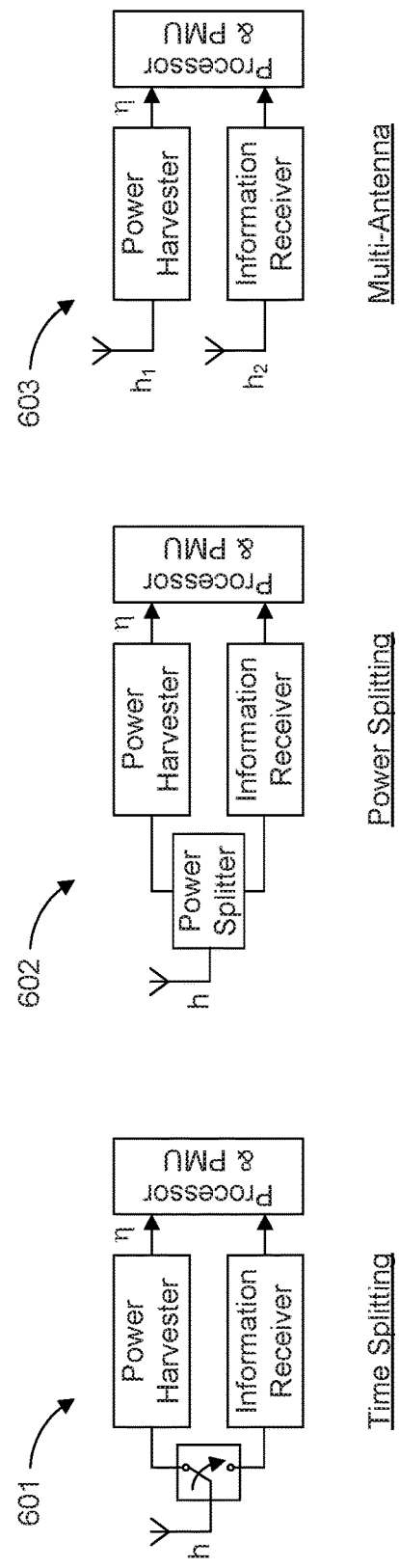
FIG. 6 shows examples of concurrent delivery of power and information at a WTRU with ZE receiver.
Figure 7A:
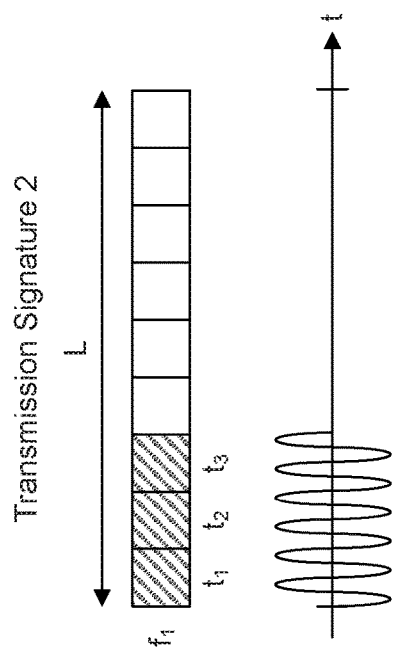
FIG. 7A shows a signaling diagram of an example ZE transmission format or signature.
Figure 7C:
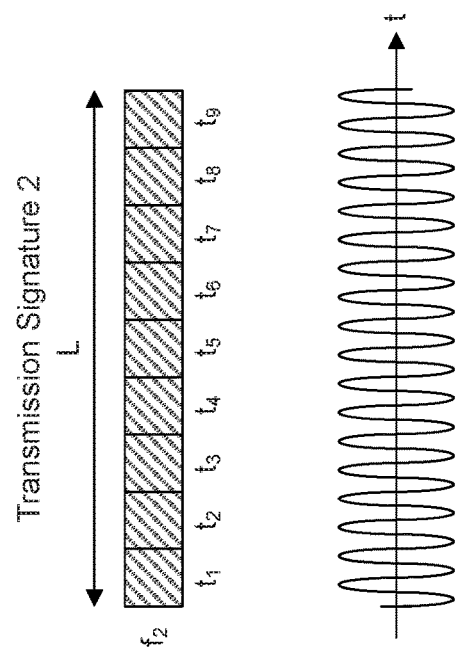
FIG. 7C shows a signaling diagram of another example ZE transmission format or signature.
Figure 7B:
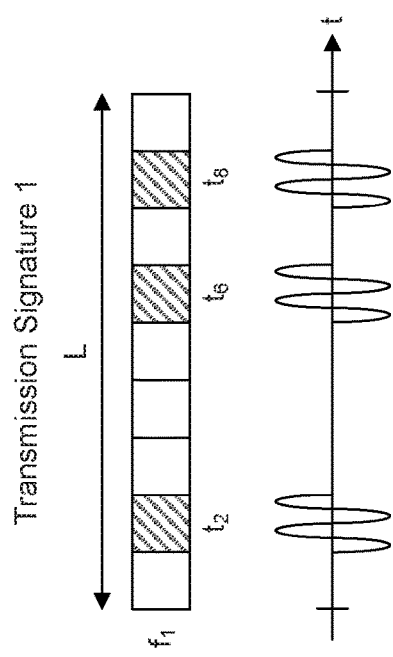
FIG. 7B shows a signaling diagram of another example ZE transmission format or signature.
Figure 7D:
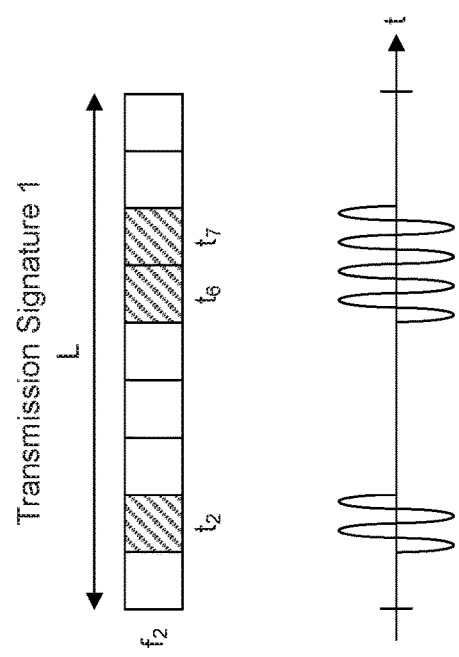
FIG. 7D shows a signaling diagram of another example ZE transmission format or signature.

FIG. 4 shows graphs of an example ZE (wakeup) signal structure and corresponding energy-harvesting profile at the WTRU that receives the ZE signal. The preamble part may be optimized for power delivery and for which the ZE (WUR) receiver is in an energy harvesting state, and the frame body may be used for power and information delivery and for which the ZE (WUR) receiver is in training and decoding state. A passive receiver may harvest or accumulate energy from the received power-optimized waveform and/or signaling parts, such as the ZE signal structure and energy-harvesting profile shown in FIG. 4. POW and/or signaling parts may be associated with a measured or observed energy signature or sequence. FIG. 5 shows a state diagram of an example state machine 500 of a ZE receiver. As illustrated in FIG. 5, processing of received ZE signaling by the passive receiver may occur according to well-defined processing states (harvest energy S1, receiver training S2, and signal decoding S3) and transition conditions (Cxx) between these states. For example, an energy-harvesting state S1 and a decoding state S3 may represent passive receiver processing while accumulating energy prior to processing an information-bearing signal(s). FIG. 6 shows examples of concurrent delivery of power and information at a WTRU with ZE receiver. As illustrated in FIG. 6, transmissions of power-optimized waveform and/or signaling parts may occur according to TDM, FDM, SDM and/or power-domain multiplexing principles (including time splitting 601, power splitting 602, and/or the use of multiple antennae 603) where ZE signaling parts may or may not be contiguous.

Examples of reference signal design using ZE waveforms are disclosed herein. In an example, a WTRU with a passive receiver may process an instance of a transmitted ZE reference signal suitable for the purpose of cell measurements based on a known ZE reference signal transmission format with known transmission characteristics.

For example, any one or more of the following transmission characteristics associated with a ZE reference signal waveform or one or more of its ZE waveform parts may be known by a passive receiver while processing a ZE reference signal: transmission duration(s) such as absolute time duration or relative time duration compared to a reference value; transmission format such as modulation scheme and its parameterization, modulation order, number and/or placement of tones, sequence and make-up of the ZE waveform part comprised as part of a transmission; power profile such as peak power, average power, a value representative of first or $N^{th}$ order power distribution profile statistics such as PAPR including the possibility of adjustment factors when calculating these; energy profile or signature, such as the number, distribution and/or separation of energy accumulation, thresholding events, energy accumulation window, or POW; and/or transmission settings in use by the transmitter of the ZE reference signal such as frequency location, transmission patterns or sequences if one or more transmission parameters are changed to randomize interference contributions and/or to improve robustness of transmissions.

In an example, transmission characteristics associated with a ZE signal waveform to be used for the purpose of cell measurements by the passive receiver may be pre-configured and/or known in the WTRU. In another example, these transmission characteristics may be signaled and configurable in the WTRU. For example, network nodes, such as MME or eNB, may use control signaling in the form of NAS, radio resource control (RRC), medium access control (MAC) control element (CE) or layer 1 (L1) signaling to configure and/or indicate transmission formats for the purpose of cell measurements using a passive receiver by a WTRU.

In an example, a WTRU processing a received ZE reference signal waveform or part thereof, may determine an applicable decoding format to process. In an example, the WTRU may determine that the POW part has duration of 0.4 ms using 4-tone transmission followed by a frame body of duration 0.2 ms using OOK carrying a cell identifier. The WTRU may then configure its passive receiver to process any received ZE reference waveform according to the configured POW part. For example, the WTRU accumulates energy from the received POW to meet the designated minimum threshold level of X nanojoules (nJ) allowing the WTRU to then decode the remaining signaling. If the threshold level is exceeded and the determined processing time duration to determine the decoding format is exceeded, the WTRU may configure its passive receiver to process the information-bearing signal part. In cases where transmission characteristics of the ZE reference signal to be measured are known at the WTRU, the receiver processing is simplified and/or measurement acquisition delay is reduced.

FIGS. 7A-7D show signaling diagrams of example ZE transmission formats or signatures. The POW may be a two-tone signal in frequency domain and be transmitted on a subcarrier frequency f1 and a subcarrier frequency f2. A transmission sequence may comprise multiple symbol intervals, for example, up to 9 symbol intervals in time. A known ZE reference signal defined for the POW part of a ZE signal may use transmission signature 1, shown in FIGS. 7A and 7C, known to the WTRU using 3 symbol intervals on subcarrier frequency f1 and 3 symbol intervals on subcarrier frequency f2. A known ZE reference signal defined for the POW part of a ZE signal may use transmission signature 2, shown in FIGS. 7B and 7D, known to the WTRU using 3 symbol intervals on subcarrier frequency f1 and 9 symbol intervals on subcarrier frequency f2. The overall resulting time-domain waveform (not shown) may allow for energy-harvesting by the WTRU due to its PAPR.

Figure 8:
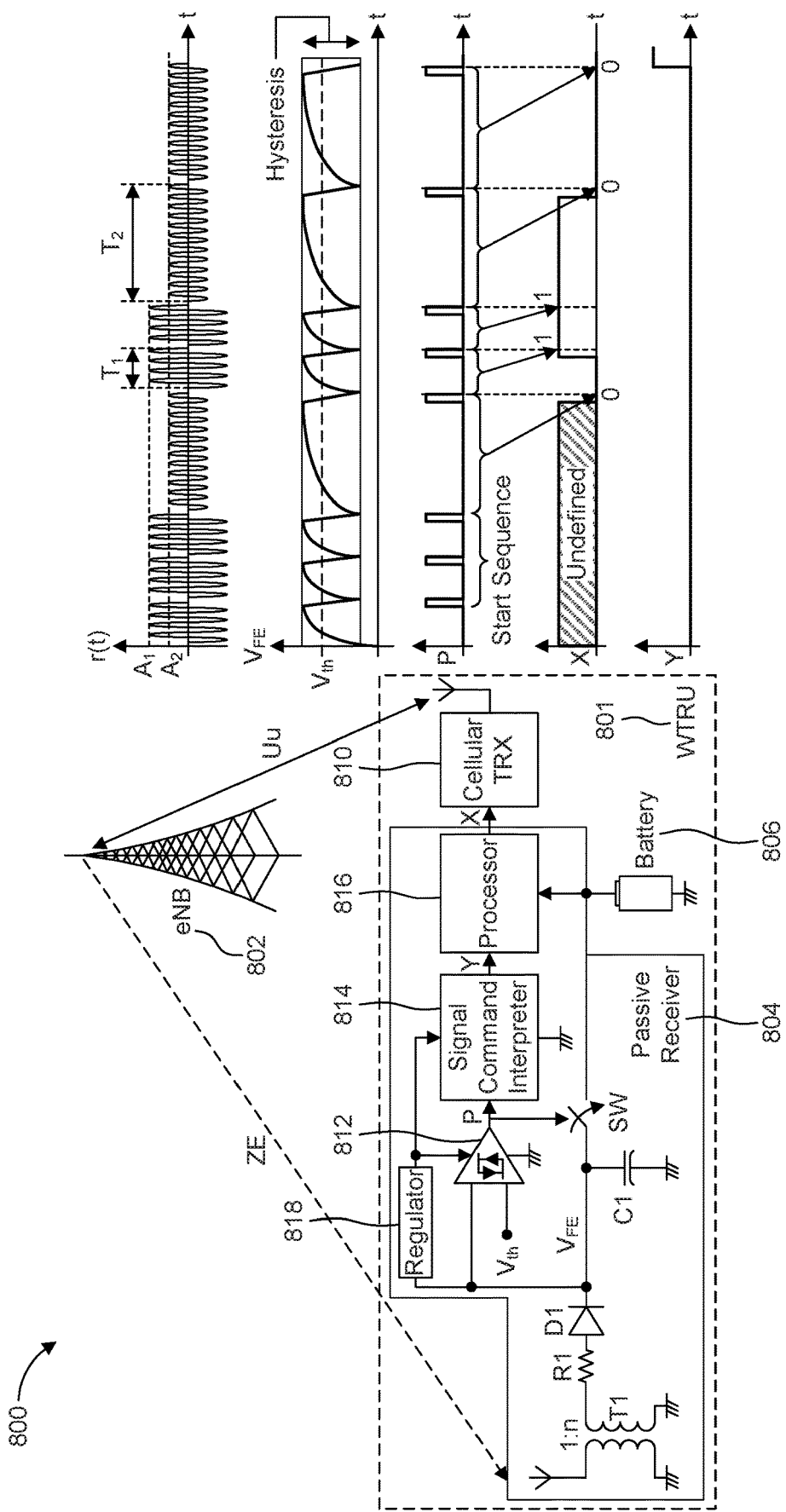
FIG. 8 shows an network architecture diagram of an example communication network 200, including a WTRU equipped with ZE (passive) receiver, and showing example detection sequences when the WTRU processes a known ZE reference transmission format.

FIG. 8 shows an network architecture diagram of an example LTE or NR communication network 200 including a WTRU 801 equipped with ZE (passive) receiver 804 and showing example detection sequences when the WTRU 801 processes a known ZE reference transmission format. As shown in FIG. 8, the WTRU 801 is equipped with a cellular transceiver (TRX) 810 for communicating with the eNB 802 over the Uu interface, and passive receiver 804 for receiving ZE signals from the eNB 802 over the ZE air interface. The cellular transceiver 810 and the/or the passive receiver 804 may be powered by battery 806. The passive receiver 804 may include, but is not limited to include, any one or more of the following components: a (operational) amplifier 812, a signal command interpreter 814, a processor 816, and/or a regulator 818, in addition to other possible circuitry and components (e.g., switches, resistors, capacitors, antenna etc.). $V_{FE}$ is the received ZE signal after indirect down-conversion using a diode/envelope detector. P represents the detected/decoded bit stream. Y is a bit representation of one of multiple commands that can be interpreted by the passive receiver 804 using the signal command interpreter 814. X can be a simple wake-up interrupt telling the Cellular TRX 810 to wake-up, or a signal that is used to define the action that should be taken by the Cellular TRX 810 based on the interpreted command. The passive receiver 804 may detect presence of a received signal r(t) with a known transmission signature (e.g., transmission signature 2 shown in FIG. 7B or 7D) by accumulating energy and comparing the accumulated energy against its known energy signature. Upon detection of the received signature, the processor 816 of the passive receiver 804 may determine a measurement sample.

In another example, a WTRU with a passive receiver may process one or more instances of ZE reference signal(s) suitable for the purpose of cell measurements based on ZE signal transmissions occurring according to known transmission schedules. For example, a transmission schedule for processing of ZE reference signals may be comprised of either one or a combination of the following characteristics associated with a ZE reference signal waveform or one or more of its ZE waveform parts. Examples of transmission schedules for ZE signals include, but are not limited to, any of the following schedules: a repetition period or duration; a number of occurrences of ZE reference signal(s); and/or a timer value. The repetition period or duration may include designated time intervals where ZE reference signal(s) may or may not be transmitted. For example, one occurrence of a ZE reference signals may be transmitted every N ms, or N occurrences equally spaced in time or according to a designated occurrence pattern are transmitted every N ms, or a first period of duration T1 with N occurrences of ZE reference signal(s) may be followed by a second period of duration T2 with no occurrences until the beginning of next duration T1 and this sequence repeating.

In an example, with respect to the number of occurrences of ZE reference signal(s), a ZE reference signal may be transmitted once, and indicated as such. In another example, the ZE reference signal may be transmitted for a number N1 times according to designated time interval(s) or a sequence thereof separating individual occurrences of ZE reference signals. In an example, with respect to the timer value, a WTRU may determine the expected occurrences for processing ZE reference signals from one or more timer values and at least one second parameter. For example, according to a timer value of 3 seconds together with a known or derived start time and recurrence period of every 0.5 seconds, the WTRU may determine that ZE reference signals are transmitted 6 times.

In an example, a transmission schedule associated with ZE reference signal(s) to be used for the purpose of cell measurements by the passive receiver may be fixed and known to the WTRU. In another example, the transmission schedule may be configurable in the WTRU. For example, network nodes such as the MME or eNB may use control signaling (e.g., NAS, RRC, MAC CE or L1 signaling) to configure and/or indicate parameters associated with a ZE signal transmission schedule for the purpose of cell measurements using a passive receiver by a WTRU.

A WTRU processing a received ZE reference signal waveform or part thereof may determine a transmission schedule to process. For example, the WTRU may determine that the instances of ZE reference signal will occur according to a sequence of time instances. The WTRU may then configure its passive receiver to process any received ZE reference waveform according to the configured sequence of determined time instances. For example, the WTRU accumulates energy from the received POW to meet the designated minimum threshold level of X nJ, thus allowing the WTRU to decode the subsequent signaling at the determined time instance that the ZE reference signal portion is due. The detection of ZE reference signals employing a known schedule at the WTRU may be more robust because more signaling instances are available, allowing for more energy accumulation, and because it allows the WTRU to tune and/or match its passive receiver to the specific transmission settings in use by ZE reference signals to achieve energy accumulation rates that match the POW characteristic of such a transmission. Additionally, when a WTRU processing a received ZE reference signal waveform is using a configurable schedule, parameterization is adjustable to the needs of a particular device. For example, to prevent energy leakage that is a function of time, a WTRU may be configured with a more suitable (e.g., shorter) repetition period. A WTRU based on a different implementation resulting in less leakage during the same amount of time may use a longer repetition period. The detection of ZE reference signals employing a known schedule at the WTRU may be more robust also because scheduled transmission may be designed to support certain mobility modes (e.g., normal, medium, and/or high mobility modes) without any further signaling requirements between network nodes.

In an example, a WTRU with a passive receiver may determine reception and/or occurrence of an instance of a ZE reference signal(s) for the purpose of cell measurements using ZE signal detection or a signaling indication such as on-demand transmission. In an example, a WTRU may determine the presence of a ZE reference signal by configuring its passive receiver according to a well-determined or known ZE reference signal transmission format.

For example, a particular transmission format for the POW part of the ZE signal waveform may be assumed by the WTRU. The WTRU may determine the rate of energy accumulation or number of threshold events over a determined period of time. If the rate of energy accumulation value exceeds a designated value (e.g., a predefined threshold), then the WTRU with passive receiver may process the received ZE signal assuming a reference signal was transmitted. A WTRU using a passive receiver may determine that a ZE reference signal waveform or part thereof is present from reception of a signaling indication carried as part of a ZE reference signal transmission or a second signal. In an example, the WTRU may determine the presence or absence of a ZE reference signal under the condition that a second signal is detected by the WTRU. An indication that a ZE reference signal is transmitted may be processed by the WTRU as part of the ZE signaling part in a frame body field. In another example, the indication may be transmitted to the WTRU implicitly, such as given by the choice of a particular transmission configuration for the ZE reference signal. A WTRU using a passive receiver may determine that a ZE reference signal waveform is received that is intended for processing by decoding an identifier. An identifier may be carried and encoded as part of a ZE reference signal transmission or a second signal.

A WTRU using a passive receiver may determine the presence of a ZE reference signal waveform. For example, the WTRU may determine that the number of POW threshold events to accumulate energy in a given period of time are in excess of a reference or threshold value. The WTRU may assume a known transmission format for the POW part of the ZE signaling. The WTRU may then determine if a ZE reference waveform is indicated using signaling received in a second signal part. For example, the WTRU may determine a specific sequence value encoded as part of the modulation format received in the frame body of the ZE waveform. If the WTRU is indicated that the ZE waveform currently being processed is a ZE reference signal, the WTRU may then determine a measurement sample value representative of an receiver level for a ZE waveform.

For any of the example mechanism disclosed herein, one or more ZE reference signals can be sent, for example on an as need basis. For example, a WTRU in a very-high-mobility mode moving through a certain tracking area may trigger a tracking area update and signal cells in the area to initiate on-demand ZE reference signal transmission. The particular format of a given ZE reference signal instance may be adopted to the particular needs of WTRUs in the coverage area (e.g., by adjusting POW parts to allow for increased energy accumulation rates for a given transmission). For example, a device close to or at the cell boundary may be configured with a more suitable (e.g., longer) energy accumulation period than a device closer to the transmission point.

Mechanisms and procedures for cell measurements using ZE signal waveforms are disclosed herein. In an example, procedures for cell measurements using ZE signal waveforms may be power-domain based. A WTRU with a passive receiver may determine the received power level of a ZE reference signal from the processed power characteristics of one or more ZE signaling part(s). Example power-domain characteristics may include, but are not limited to include, any of the following characteristics: peak power of a POW, a signaling part or of designated resource elements; average power of a POW, a signaling part or of designated resource elements; and/or a value representative of the first or $N^{th}$ order power distribution statistics (e.g., PAPR) of a POW, a signaling part or of designated resource elements.

In another example, procedures for cell measurements using ZE signal waveforms may be time-domain based. A WTRU with a passive receiver may determine the receiver power level of a ZE reference signal based on time-domain characteristics (e.g., the observed rate of change in energy-accumulation) when processing ZE signaling parts. A passive receiver in a WTRU may determine a cell measurement while processing a received ZE reference signal (or one of its parts) using any one or more of the following example time-domain characteristics associated with a received ZE reference signal waveform, the POW or one or more ZE reference signal parts. An example time-domain characteristic may include time to accumulate ZE energy so that the accumulated energy level reaches a threshold level X1. Another example time-domain characteristic may include average of time distribution for an energy level to reach a threshold level X2 for a number of measurement samples taken on ZE waveforms. Another example time-domain characteristic may include a value representative of a first or $N^{th}$ order time distribution statistics for reaching a threshold level X3 for a number of measurement samples taken on ZE waveforms. Another example time-domain characteristic may include a maximum or a minimum value for an energy level to reach a threshold level X4 for a number of measurement samples taken on ZE waveforms. Another example time-domain characteristic may include a number of thresholding events observed to reach a threshold level N1. Another example time-domain characteristic may include average of number of thresholding events observed for an energy level to reach a threshold level N2 for a number of measurement samples taken on ZE waveforms. Another example time-domain characteristic may include a value representative of first or $N^{th}$ order time distribution statistics for the number of thresholding events. Another example time-domain characteristic may include a maximum or a minimum value for a number of thresholding events observed to reach a threshold level N4 when taking measurement samples on ZE waveforms. Any of the example time-domain characteristics may be measured or derived using a configurable or adjustable observation interval (e.g., a measurement window).

When a number of thresholding events reaching a threshold level N1 is observed, assuming this number is collected over a fixed time window, then the number of thresholding events may correspond to a value representative of a first order or $N^{th}$ order power distribution statistics. Thus, the power metric can may be considered a discretization of power levels. A WTRU implementing a passive receiver may derive a metric directly representative of the ZE signaling waveform. With increased distance to the transmitter, for a given PAPR and duration of a POW part, the energy accumulation rate per time unit may decrease, subject to propagation conditions and/or subject to interference on the channel (e.g., depending on the transmission approach).

In another example, procedures for cell measurements using ZE signal waveforms may include a WTRU with a passive receiver determining the receive power level of a ZE reference signal based on the observed time difference between energy transfer events (e.g., clicks) when processing ZE signaling parts. In this case, any one or more of the following characteristics associated with a received ZE reference signal waveform or one or more of its signal parts may be used by a passive receiver to determine a cell measurement while processing a ZE reference signal, using a POW or signaling part of a ZE waveform. Examples of time-domain characteristics based on energy transfer events may include, but are not limited to include, any of the following characteristics: time difference $\Delta T_j$ between the $(j-1)^{th}$ and the $j^{th}$ (successive) transfer events (clicks), where energy from a first storage element of a preconfigured first capacity is transferred to a second storage element of a preconfigured second capacity when the accumulated energy in the empty first storage element exceeds a preconfigured threshold; average time deference between N successive clicks measured over a preconfigured time duration on ZE waveforms or parts of ZE waveforms; and/or a value representative of the first or $N^{th}$ order time distribution statistics of successive clicks measured over a preconfigured time duration on ZE waveforms or parts of ZE waveforms. A WTRU implementing a passive receiver can derive a metric directly representative of the ZE signaling waveform. With increased distance to the transmitter, for a given PAPR and duration of a POW part, the average time difference between successive clicks may increase subject to propagation conditions.

Example measurement evaluation procedures are disclosed herein. In an example, a WTRU determining an Rx level (a received power level) of a ZE reference signal may combine multiple sample values into one value used for evaluation purposes. For example, a WTRU may take a Rx level sample of a ZE reference signal determined (e.g., using power and/or time domain based methods described above) at a given occurrence and then determine if a cell (re-) selection criteria is met or not met combining these samples by means of a filter such as an averaging filter, a linear filter, or an exponential filter.

A WTRU determining an Rx level of a ZE reference signal may account for adjustment factors when determining if cell (re-)selection criteria is met. These selected adjustment and/or offset values may be applied per Rx level sample, per filtered value and/or when determining applicability of the criteria itself. In an example, an adjustment and/or offset value associated with the use of ZE reference signal(s) to be used for the purpose of evaluating a cell (re-)selection criterion by the passive receiver may be fixed and known to the WTRU. In another example, the adjustment and/or offset value may be configurable in the WTRU. For example, network nodes such as the MME or eNB may use control signaling (e.g., in the form of NAS, RRC, MAC CE or L1 signaling) to configure and/or indicate such adjustment and/or offset values for the purpose of evaluation of a cell (re-) selection criterion to be used by a WTRU implementing a passive receiver. Such offset values may be associated with particular RATs, tracking area, routing areas, cell and/or cell groups. Such offset values may be used by a WTRU passive receiver if a serving cell is strong enough such that measurement on neighboring cells may not need to be considered.

A WTRU determining an Rx level of a ZE reference signal may account for multiple antenna transmissions when a ZE reference signal is transmitted and/or received. A WTRU processing a received ZE reference signal may determine a sample value representative of the Rx level of the ZE waveform using observed time to accumulate energy up to a threshold value X1 of the POW portion of the ZE reference signal. The WTRU may then repeat this processing, deriving each time a single filtered exponentially weighted average value using the last derived sample as new input. The WTRU implementing a passive receiver may then compute a cell (re-)selection criteria using the derived weighted average value (representative the RX level of the ZE waveform) in combination with an offset value to determine a signal level at which measurements of neighboring cells should to be started. By using adjustment and/or offset values, the number of evaluations and/or number of measurement samples on neighboring cells to include may be controlled, and eventually reduced by proper network settings. A WTRU with a passive receiver may benefit from longer energy accumulation durations if only a serving cell is to be measured. Therefore, measurement samples become more reliable, and/or more accumulated energy may be used to decode information-bearing signals.

Example measurement evaluation procedures may include comparing cellular measurements to ZE measurements. The received power level of a ZE reference signal made by a WTRU using a passive receiver may be related to cellular Rx level (reception power level) measurements (e.g., reference signal received power (RSRP) using a lookup table). Any one or more of the following example measurements made using a passive receiver on a received ZE reference signal waveform or one or more of its signal parts may be used by a WTRU to approximate a cellular RSRP measurement using a lookup table. For example, the ZE measurement may consist of a single power-domain or time-domain ZE measurement. In another example, the ZE measurement may be a weighted sum of multiple power-domain ZE measurements or may represent a first or $N^{th}$ order time distribution statistics of multiple power-domain ZE measurements. In another example, the ZE measurement may be a weighted sum of multiple time-domain ZE measurements or represents a first or $N^{th}$ order time distribution statistics of multiple time-domain ZE measurements. In another example, the ZE measurement may be a weighted sum of multiple power-domain and time-domain measurements or may represent a first or $N^{th}$ order time distribution statistics of multiple power-domain and time-domain ZE measurements. A WTRU in idle mode may use a passive receiver to derive a metric directly representative of a cellular (e.g. RSRP measurement), thereby reducing the required cellular measurements in idle mode and ultimately improving the WTRU's battery life.

Figure 9:
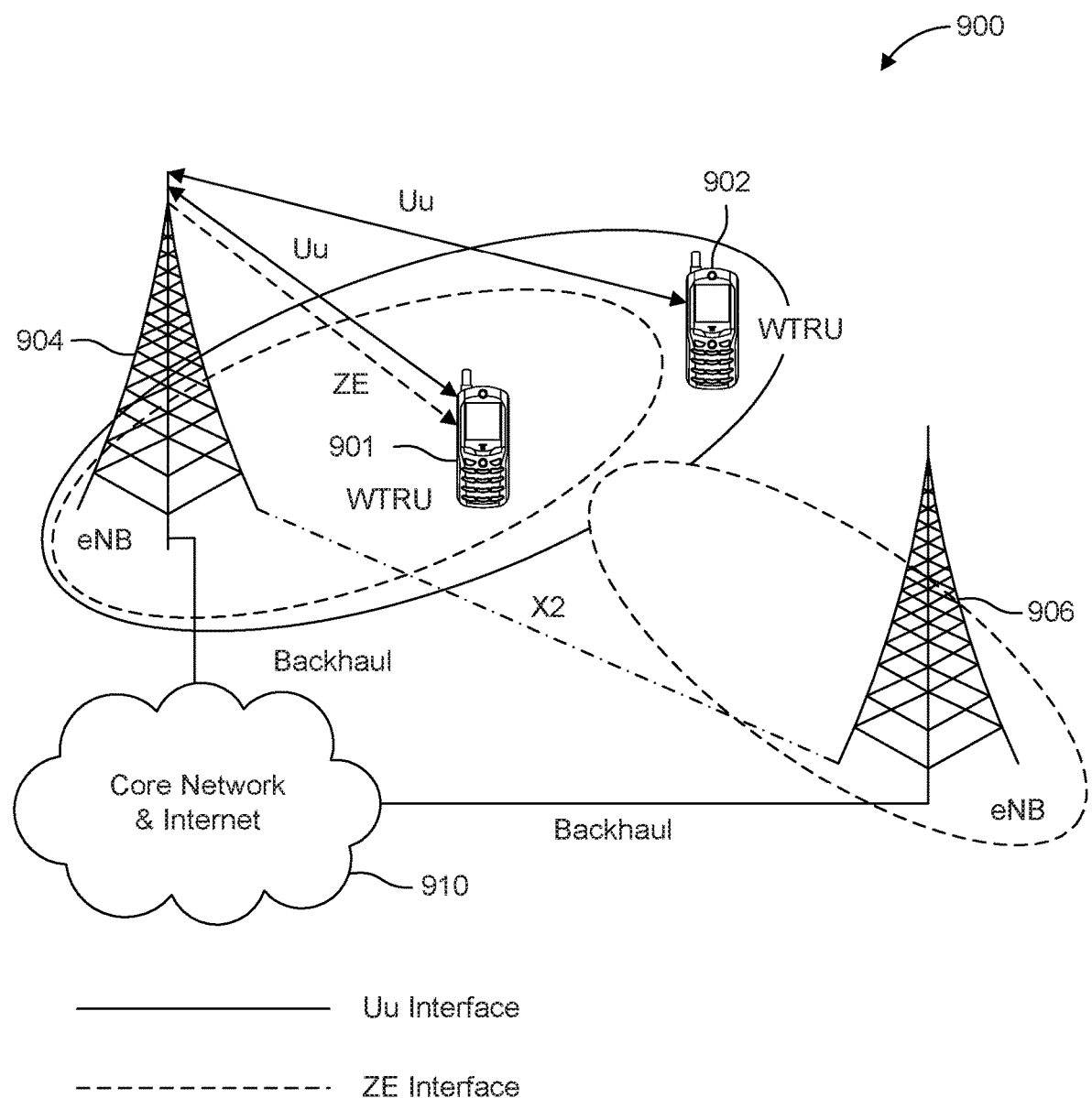
FIG. 9 shows a network architecture diagram of an example communication network including WTRUs equipped with a cellular transceiver (TRX) and a passive receiver.

FIG. 9 shows a network architecture diagram of an example LTE or NR communication network 900 including WTRUs 901 and 902 equipped with a cellular transceiver (TRX) for communicating with the eNBs 904, 906 over the Uu interface, and a passive receiver for receiving ZE signals from the eNBs 904, 906 over the ZE air interface when in range of to successfully receive ZE waveform signals. the WTRUs 901, 902 may communicate with the CN (and Internet) 910 via eNBs 904, 906 over backhaul links, and the eNBs may exchange messages over the X2 interface.

Example procedures for cell (re-)selection for WTRUs with a passive receiver are disclosed herein. In an example, a WTRU with a passive receiver may indicate operating frequency bands and/or frequency band combinations that are supported by its passive receiver by means of signaling with the RAN and/or CN (e.g., by means of a WTRU capability indication). For example, a WTRU implementing a passive receiver may use the main cellular modem to indicate its supported WTRU capabilities associated with the passive receiver as part of its signaling exchanges when registering its presence in the RAN and/or CN during connection establishment and authentication/security procedures. In another example, The WTRU radio access capability information associated with a WTRU with passive receiver may be transferred by the WTRU using a WTRU capability inquiry procedure.

A WTRU implementing a passive receiver may indicate if the passive receiver is capable to operate on one or more designated operating (frequency) bands. The WTRU may indicate if a particular receiver sensitivity is associated with passive receiver operation on a given supported (frequency) band. The WTRU may indicate if a particular minimum or reference energy accumulation rate is associated with passive receiver operation for one or more supported operating (frequency) bands.

When making WTRU passive receiver capabilities known to the network, a WTRU may deliberately inter idle mode operation using the passive receiver, at little to no power consumption, instead of cellular radio idle mode operation requiring device power. Identifying operating bands may simplify passive receiver implementation. Per-band indication may be useful because RF coexistence considerations may make it costlier or prohibit the use of passive receiver technology on certain operating frequency bands.

In another example, a WTRU with a passive receiver may determine the WTRU's configuration using the main cellular transceiver, such as whether the WTRU should operate in idle mode, according to cellular procedures and/or according to passive receiver cell (re-)selection procedures. A WTRU with a passive receiver and a main cellular transceiver may receive configuration signaling from the network indicating whether the WTRU should enter idle mode (e.g., RRC_IDLE) and use the passive receiver (and not using the main cellular transceiver) or whether the WTRU should enter idle mode (e.g., RRC_IDLE) using the main cellular transceiver. In an example, a WTRU initially connecting, or re-connecting, to the network using its main cellular transceiver (PCR) (e.g., for connection establishment, authentication/security procedures, and/or tracking update procedures) may receive an idle mode signaling indication or idle mode configuration as part of signaling exchanges with the RAN or CN nodes. For example, RRC or mobility management (MM) signaling carried in (dedicated per-WTRU or broadcast) DL control signaling messages may be used to configure and parameterize the WTRU with a passive receiver in either passive receiver mode or cellular mode when transitioning to RRC_IDLE.

For example, a WTRU entering, selecting or re-selecting a cell under network coverage may receive idle mode signaling by decoding system broadcast information carried on a DL signaling channel decoded using the main cellular transceiver, or from a DL signaling channel decoded by the passive receiver. In another example, the WTRU may determine whether to use the passive receiver or the main cellular transceiver based on pre-stored and known information, such as specific cell, PLMN, frequency band and/or information stored from previously received signaling, control information or measurements.

An idle mode configuration signaled and/or determined by the WTRU to use passive radio mode or cellular radio mode in RRC_IDLE may be associated with any on one or more of the following parameters or criteria. In an example criteria, the use of passive receiver may be allowed, disallowed enabled, disabled, preferred, or conditional per cell or per group of cells. In another example criteria, the use of passive receiver may be allowed, disallowed enabled, disabled, preferred, or conditional per RAN or CN level defined tracking, location or routing or RAN notification areas. In another example criteria, the use of passive receiver may be allowed, disallowed enabled, disabled, preferred, or conditional per frequency layer or operating frequency band(s). In another example criteria, the use of passive receiver may be allowed, disallowed enabled, disabled, preferred, or conditional per PLMN or list of PLMNs or equivalent PLMNs. In another example criteria, the use of passive receiver may be allowed, disallowed enabled, disabled, preferred, or conditional per RAT. In another example criteria, the use of passive receiver may be allowed, disallowed enabled, disabled, preferred, or conditional per mobility state or list of mobility states. Another example parameter may include Rx signal levels and thresholds, offset and hysteresis value(s). Another example parameter may include time durations, counters, allowed off-channel periods or time-to-reconnect periods. Another example parameter may include device classes or categories. Another example parameter may include cells barred, cells reserved, or cells restricted for operator use. Another example parameter may include unified access control.

For example, a WTRU may be configured such that use of its passive receiver is enabled and the main cellular transceiver when entering RRC_IDLE. In another example, the WTRU may be configured to enter RRC_IDLE using a passive receiver under the condition that the Rx level (received power level) determined by the passive receiver is above a minimum (threshold) value R1. FIG. 10 shows a flow diagram of an example WTRU autonomous fallback procedure 1000 for idle mode operation using a passive receiver. At 1002, the WTRU may receive over the Uu interface cell (re-)selection (CR) parameters using the main transceiver and locally store the CR parameters (e.g., any of the parameters disclosed herein). At 1004, the WTRU may enter idle mode using the ZE receiver only and disabling its cellular transceiver. At 1006, the WTRU may measure the Rx level (received power level) of received signals using the ZE receiver, and continue such measurements until the Rx level falls below a critical value or threshold. Once the Rx level falls below the critical value or threshold (e.g., for time T and hysteresis H), then at 1009 the WTRU may start up its main cellular transceiver. At 1010, the WTRU camps on a call, for example using a cellular RRC_IDLE procedure, and remains in an RRC_IDLE state using its cellular transceiver, for example until a condition C occurs.

In another example, the WTRU may receive an indication that the WTRU should re-connect to the network in order for the WTRU to indicate its location area periodically (e.g., every H1 hours or every M1 minutes). In another example, the WTRU may be configured such that use of its passive receiver is enabled as long as the tracking area identifier decoded from a ZE signaling waveform is included in a list of designated CN tracking area codes. In an example, information such as tracking area identifier (or any other information disclosed herein) may be encoded in the POW part of the ZE signal waveform by number and separation of configured threshold events. In another example, the tracking area identifier (or any other information disclosed herein) may be encoded as part of the information bearing part (e.g., frame body) of the ZE signal.

Mechanisms for eligibility for WTRU passive receiver operation are disclosed herein. In an example, a WTRU entering RRC_IDLE may determine whether passive receiver mode or cellular receiver mode should be used. In an example, this determination may be based on DL control signaling, system information and/or stored information. If passive receiver mode is configured, the WTRU may determine applicable conditions under which the use of a passive receiver is allowed or enabled. This determination may be based on any one or more of the following parameters specified above. An example parameter may be based on Rx signal level threshold, offset and hysteresis configured for a specific cell accumulated over a specific time interval. Another example parameter may be based on a number of threshold events measured within a specified time interval for a specific tracking area or a list of equivalent PLMNs. Another example parameter may be based on device category, Rx signal level threshold, offset and/or access categories for unified access control. The WTRU using a passive receiver in idle mode may check if applicable conditions for passive receiver operation are met. In an example, the WTRU may determine whether an Rx level measured from a ZE reference signal is above a minimum reception threshold and/or whether the most recent determined tracking area identifier is part of the allowed set. In another example, the WTRU may determine the number of threshold events measured with a specified time interval for a specific tracking area or a list of equivalent PLMN. If any of the conditions under which the use of a passive receiver is allowed or enabled are not met, then the WTRU may start up the main modem transceiver and re-connect to the network or resume operation using the main cellular transceiver.

The use of a passive receiver by the WTRU (and the benefit of little to no power consumption in RRC_IDLE) may be enabled even if coverage of ZE signaling in a geographic area is less than what is provided by DL cellular coverage. For devices within radio range of passive receiver technology, paging is possible with significantly reduced latency, standby times are dramatically increased, and for devices leaving passive receiver coverage under mobility condition, re-connection to the network using the main modem receiver may be invoked.

Mechanisms for mobility-based ZE reference signal configuration are disclosed herein. A WTRU may determine a mobility state to be used in idle mode for use with passive receiver operation. In an example, one or more mobility states may be defined, signaled and/or configured (e.g., almost-stationary, normal, medium, high or very-high mobility). Mobility states may be valid in some cells or cells may only support a subset or the full set of these mobility states on a per-cell level, a per-tracking level, location, or routing area-level.

Either one or a combination of the following ZE reference signal transmission configurations may be considered by some or all of the cells associated with a certain tracking area, location area, and/or routing area based on supported mobility states and the mobility statuses of the WTRUs in the corresponding cell coverage areas. Examples of such transmission configurations include, but are not limited to, the following example configuration: scheduled transmission where ZE reference signal transmission occurs according to a known schedule with a repetition period chosen to guarantee the support of all WTRU mobility states up to a certain level or speed (e.g., up to medium or high mobility); and/or on-demand transmission where reference signal transmission may or may not follow a known schedule, and the number of occurrences within a certain period of time may support a certain mobility state (e.g., almost-stationary mobility).

In an example, a reference signal configuration may be updated by the cellular network (e.g., the eNB) for some or all the cells within a tracking area, location area, and/or routing area during the location update/registration procedure for new WTRUs and based on the mobility status of current WTRUs associated with the corresponding area. For example, one or more tracking areas that are configured to support all mobility states, and currently have some or all of their cells considering on-demand ZE reference signal transmission to support almost-stationary WTRUs, may receive a request to switch to scheduled ZE reference signal transmission that supports normal mobility state. The switch request may be a result of a mobility status signal from a WTRU during a location registration procedure and based on its most recent mobility state detected. In another example, a reference signal configuration update may be triggered by a change in the mobility status of one or more of the WTRUs within a certain tracking area, location area, or routing area. For example, one of the WTRUs in an area, whose cells are configured with on-demand reference signal transmission that supports almost-stationary mobility, may detect a change in mobility status to normal mobility. The WTRU may then wake up the main cellular transceiver in order to signal a mobility status change, and based on the network response the WTRU may decide to return to RRC_IDLE using either the main cellular transceiver or the passive receiver.

In an example, a combination of both scheduled and on-demand ZE reference signal transmission may be an option for some or all of the cells in a certain tracking area, location area, or routing area. For example, an area where all the cells are configured with scheduled reference signal transmission that supports normal mobility WTRUs may be considered. A new WTRU may initiate tracking, location, or routing area update to that area and the WTRU may signal very-high speed mobility as its most recently detected state. The network may then signal cells in the area to complement the currently considered scheduled transmission with an on-demand transmission that supports very-high mobility state for a specific amount of time or until the reception of another signal. A WTRU may check if a change in the tracking area identifier (that needs a tracking area update procedure) or a change in the mobility status is detected using passive receiver procedures. The WTRU may wake up the main cellular transceiver to perform either a tracking area update or mobility status update procedure, signaling its most recently detected mobility status to the network. Based on the network response, the WTRU may decide whether to return to RRC_IDLE mode using the main cellular transceiver or the passive receiver. A network adopting an adaptive ZE reference signal transmission in support of WTRUs with passive receiver implementation may optimize its power expenditure based on the served WTRUs' various mobility requirements.

Example WTRU procedures for cell (re-)selection over the ZE air interface are disclosed herein. In an example, a WTRU with passive receiver implementation in ZE idle mode may perform any one or more of the following operations (in addition to the other passive receiver idle mode procedures described herein): cell measurements (serving cell and/or neighbor cell); evaluation of cell selection and reselection criteria; camping on the cell chosen from cell (re-)selection criteria; and/or fallback to Uu receiver if fall back trigger is detected.

Figure 11:
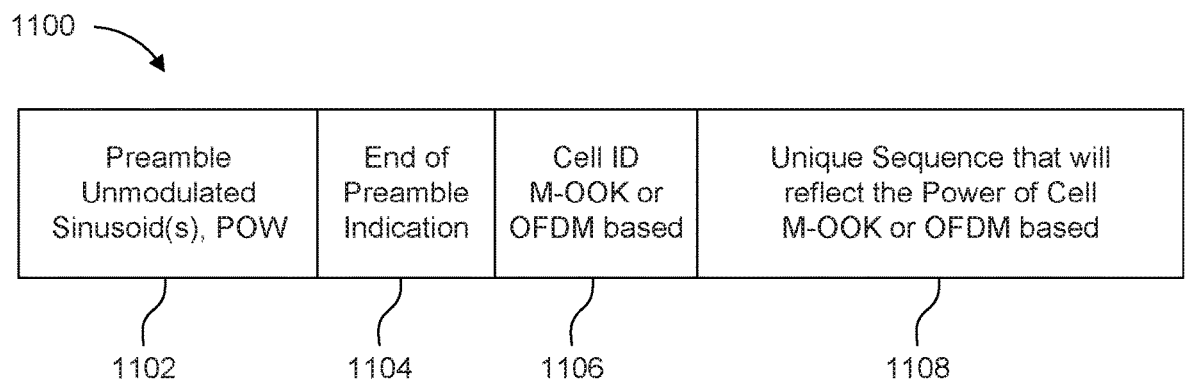
FIG. 11 shows a frame format of an example ZE measurement signal frame format with explicit cell ID indication.

Example WTRU procedures for cell identification and cell measurements performed by a passive receiver based on explicit indication of cell ID are disclosed herein. According to an example procedure for cell identification and cell measurement, a WTRU using the passive receiver may use ZE reference signals, as described above, to perform the cell measurements. FIG. 11 shows a frame format of an example ZE measurement signal frame format 1100 with explicit cell ID indication 1106 (e.g., M-OOK or OFDM based). The ZE signal format 1100 used for cell measurement may be such that cell ID 1106 can be explicitly indicated to the WTRU, as shown in FIG. 11. Other fields of the ZE signal format 1100 may include, but are not limited to include, the preamble 1102, the end of preamble indication 1104, and/or a unique sequence 1108 that will reflect the power of the cell (e.g., M-OOK or OFDM based). Based on this cell ID 1106, a ZE receiver may know the cell for which it is performing cell measurements and may store the measurements per cell for later use as cell reselection criteria.

According to example procedures for cell identification and cell measurements performed by a passive receiver, a WTRU may detect the POW preamble (1102) and end of preamble indication (1104) in a ZE measurement reference signal (1100). The WTRU may start decoding the cell ID (1106) following the preamble (1102/1104) transmission. The WTRU may use a known sequence, that may or may not be unique to the detected cell, to measure the cell's signal strength. The order of transmission of different fields in the ZE measurement reference signal may be different than the those shown in FIG. 11, such that procedure may be performed in the order that these fields occur in the ZE measurement reference signal frame format. The WTRU may store the signal strength measurement sample for further processing or directly evaluate the measurement using the cell (re-) selection criteria. Any one or more of the following transmission characteristics associated with ZE reference signal waveform, or any of the ZE waveform parts, may be known to the passive receiver at the WTRU while processing a received ZE reference signal: a prior knowledge of the frame format of the ZE measurement reference signal (e.g., modulation formats, time duration, and/or period of the ZE reference signal); a known preamble format used as POW with an end of preamble indication; a signaling part representative of transmitting the cell ID; and/or a sequence suitable for cell signal strength measurements (that may be unique for each cell or common among a group of cells).

To guarantee an efficient decoding of ZE measurement reference signal, the network may coordinate the transmission of the ZE measurement reference signals among neighboring cells in such a way that a passive receiver at a WTRU may be able to distinguish the ZE reference signal, or part thereof, received from each of the different cells. In an example, the coordination may be such that part of ZE measurement reference signal that is used for cell ID identification and signal strength measurements may be transmitted in time multiplexing manner so that at any instant only a single cell transmits the reference signal part corresponding to cell ID and the strength measurement sequence. In another example, the cell ID and signal strength measurement parts may be transmitted in different frequencies in a frequency multiplexed manner such that the passive receiver may tune to different frequencies to decode those signals for each cell. In another example, the network may coordinate the transmission of the ZE measurement reference signal among the neighboring cells in such a way that only the cell ID part of ZE measurement reference signal may be transmitted in a time multiplexed manner so that at any one time only one cell transmits its cell ID. In another example, the cell ID can be transmitted in different frequencies in a frequency multiplexed manner such that the passive receiver will tune to different frequencies to decode the cell ID. After the decoding of the cell ID part, the passive receiver may determine the information of the unique sequence per cell to apply to the reception of the signal strength measurement part of the signal for each cell.

Figure 12:
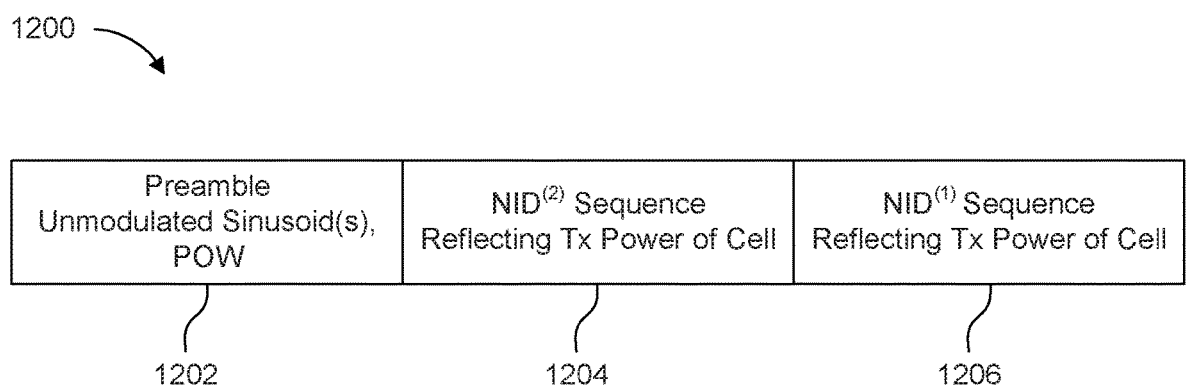
FIG. 12 shows a frame format of an example ZE measurement signal frame format with implicit cell ID indication.

Example procedures for cell identification and cell measurements performed by a passive receiver may be based on implicit indication of cell ID. FIG. 12 shows a frame format of an example ZE measurement signal frame format 1200 with implicit cell ID indication. A WTRU with passive receiver may use ZE measurement reference signals (1200) for cell measurement which implicitly indicate the cell ID to the WTRU. The WTRU may need to decode the cell ID in order to know the cell for which it is performing cell measurements and may store the measurements per cell for cell reselection criteria. The WTRU may detect the POW preamble (1202). The WTRU may use a list of preconfigured identifiers to blindly decode the $NID^{(2)}$ sequence (1204) in the ZE measurement reference signal (1200) and may perform the cell signal strength measurement.

The identifier $NID^{(2)}$ (1204) may correspond to part of the physical cell identifier (i.e. N1 or any other part), or it may correspond to a ZE identifier (ID) that is unique in a ZE tracking area for the ZE air interface. The detected $NID^{(2)}$ (1204) may be used to indicate another limited set of possible preconfigured identifiers that may be used to blindly decode the $NID^{(1)}$ (1206) of the cell. $NID^{(1)}$ (1206) may correspond to a part of the physical cell identifier that is different than $NID^{(2)}$ (i.e. $N_{ID}^{(1)}$ or any other part), or it may correspond to a ZE identifier (ID) that may or may not be unique in a ZE tracking area. $NID^{(1)}$ and $NID^{(2)}$, together or each individually, may be mapped to a unique physical cell identifier. Cell signal strength measurement may then performed. The WTRU may use $NID^{(1)}$ and/or $NID^{(2)}$ to determine the ZE and physical cell IDs. The WTRU may store the cell signal measurement sample for further processing or use it to directly evaluate the measurement using the cell (re-) selection criteria. In an example, a unique mapping between may exist between the ZE cell IDs and physical cell IDs within a specific ZE tracking area, and the unique mapping may be signalled to the WTRU (e.g., by the eNB via the Uu air interface). This mapping may be used by the Uu idle mode operation to start the cell selection and reselection. The order of transmission of different fields in the ZE measurement reference signal may be different than the one shown in FIG. 12 such that the steps of the procedure will be performed in the order these fields occur in the ZE measurement reference signal frame format 1200.

Any one or more of the following example transmission characteristics associated with ZE measurement reference signal waveform, or one or more of its ZE waveform parts, may be known to the passive receiver while processing the ZE reference signal: prior knowledge of the frame format of a ZE measurement reference signal (e.g., modulation format, duration and/or period of the ZE reference signal); a known preamble format used as POW; and/or $NID^{(1)}$, $NID^{(2)}$ as a list/table of identifiers to be tracked within a specific area.

Figure 13A:
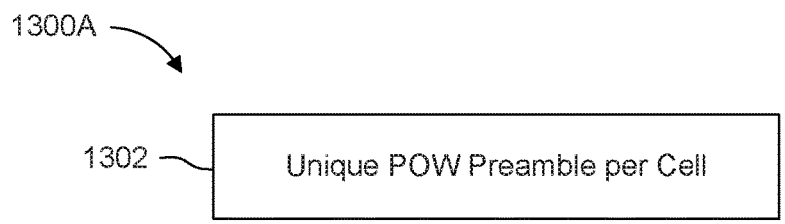
FIG. 13A shows a frame format of another example ZE measurement signal frame format with implicit cell ID indication.
Figure 13B:
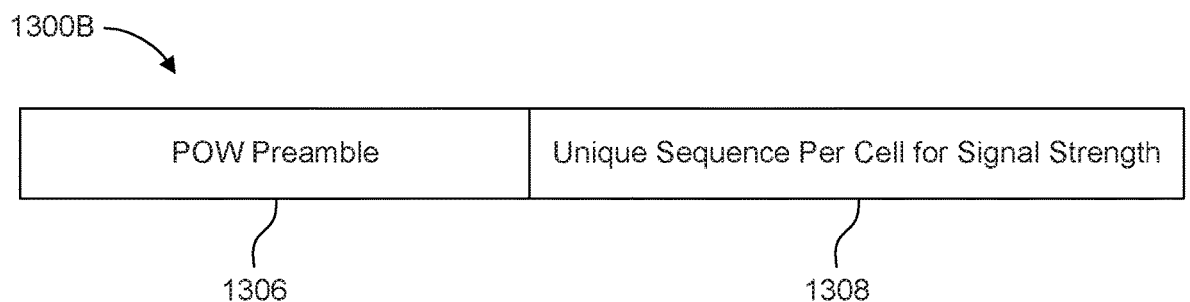
FIG. 13B shows a frame format of another example ZE measurement signal frame format with implicit cell ID indication.
Figure 13C:
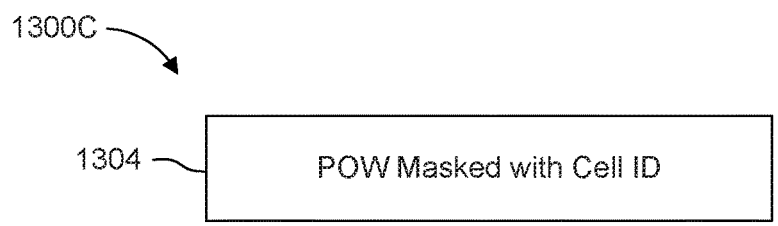
FIG. 13C shows a frame format of another example ZE measurement signal frame format with implicit cell ID indication.
Figure 13D:
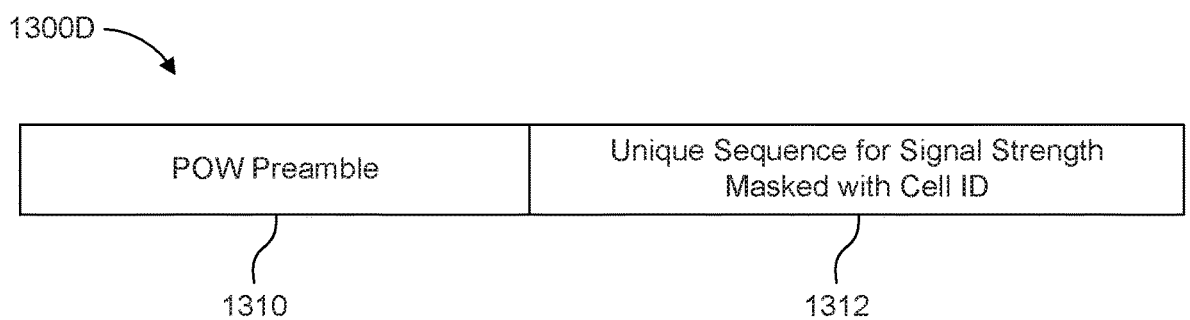
FIG. 13D shows a frame format of another example ZE measurement signal frame format with implicit cell ID indication.

Example procedures for cell identification and cell measurements performed by a passive receiver may be based on implicit indication of cell ID such that the preamble format used for POW is unique for each neighboring cell or a sequence which is unique for each cell is transmitted after a common POW transmission. In an example, the POW or the sequence following the POW in the ZE measurement reference signal may be constructed by masking known signals/sequences with a unique cell ID. FIGS. 13A-13D, shows frame formats of example ZE measurement signal frame formats 1300A, 1300B, 1300C, 1300D with implicit cell ID indication. For example, the implicit cell ID may be indicated by a unique POW preamble per cell 1302 (FIG. 13A), a unique sequence per cell for signal strength 1308 following the POW preamble 1306 (FIG. 13B), a POW masked with cell ID 1304 (FIG. 13C), or a unique sequence for signal strength masked with cell ID 1312 following the POW preamble 1310 (FIG. 13D). The unique cell ID may correspond to the physical cell ID, or it may correspond to a ZE cell ID that is unique in a ZE tracking area for ZE air interface. There may be a unique mapping between the ZE cell IDs and physical cell IDs within a specific ZE tracking area that is signalled to the WTRU via Uu air interface. This mapping may be used by the Uu idle mode operation to start the cell selection and reselection procedures. The WTRU may blindly decode the cell ID, using a list of (ZE or physical) cell identifiers and by mapping to unique sequences/signatures, in order to know the cell for which it is performing cell measurements. The WTRU may store the measurements per cell in order to be used for cell (re-) selection criteria evaluation.

In an example, a WTRU may use the POW preamble (1302 in FIG. 13A) for energy harvesting. In another example, if the POW is masked with a unique sequence representative of a cell ID (1304 in FIG. 13C), the WTRU may utilize the POW preamble to blindly decode the cell identifier while harvesting energy and/or measuring the identified cell's signal strength at the same time. If the POW is generic for all considered cells (e.g., serving and/or neighboring) and is not masked with a unique sequence, the WTRU may utilize a unique sequence representative of the a cell ID (1308 in FIG. 13B) that follows the transmission of the generic POW to blindly decode the cell identifier and measure the identified cell's signal strength at the same time. The WTRU may map the measured signal strengths to their corresponding cell identifiers and use them directly to evaluate cell (re-) selection criteria and/or store them along with their mapping for further processing before evaluation. The unique sequence representative of a cell identifier might be defined as the (ZE or physical) cell identifier itself or a known sequence masked with the cell identifier or a specific unique sequence that can be mapped (e.g., through a lookup table), to the cell identifier.

Any one or more of the following transmission characteristics associated with ZE reference signal waveform, or one or more of its ZE waveform parts, may be known to the passive receiver while processing the ZE reference signal: prior knowledge of the frame format of a ZE measurement reference signal (e.g., modulation formats, time duration and/or period of the ZE reference signal); a known preamble format used as POW for harvesting energy or list of preamble sequences; list of physical cell IDs, ZE cell IDs, and/or unique sequences with mapping to cell identifiers; and/or composition of POW signals and measurement sequences (e.g., specified unique sequences with mapping to cell identifiers or known sequences masked with cell identifiers).

Figure 14:
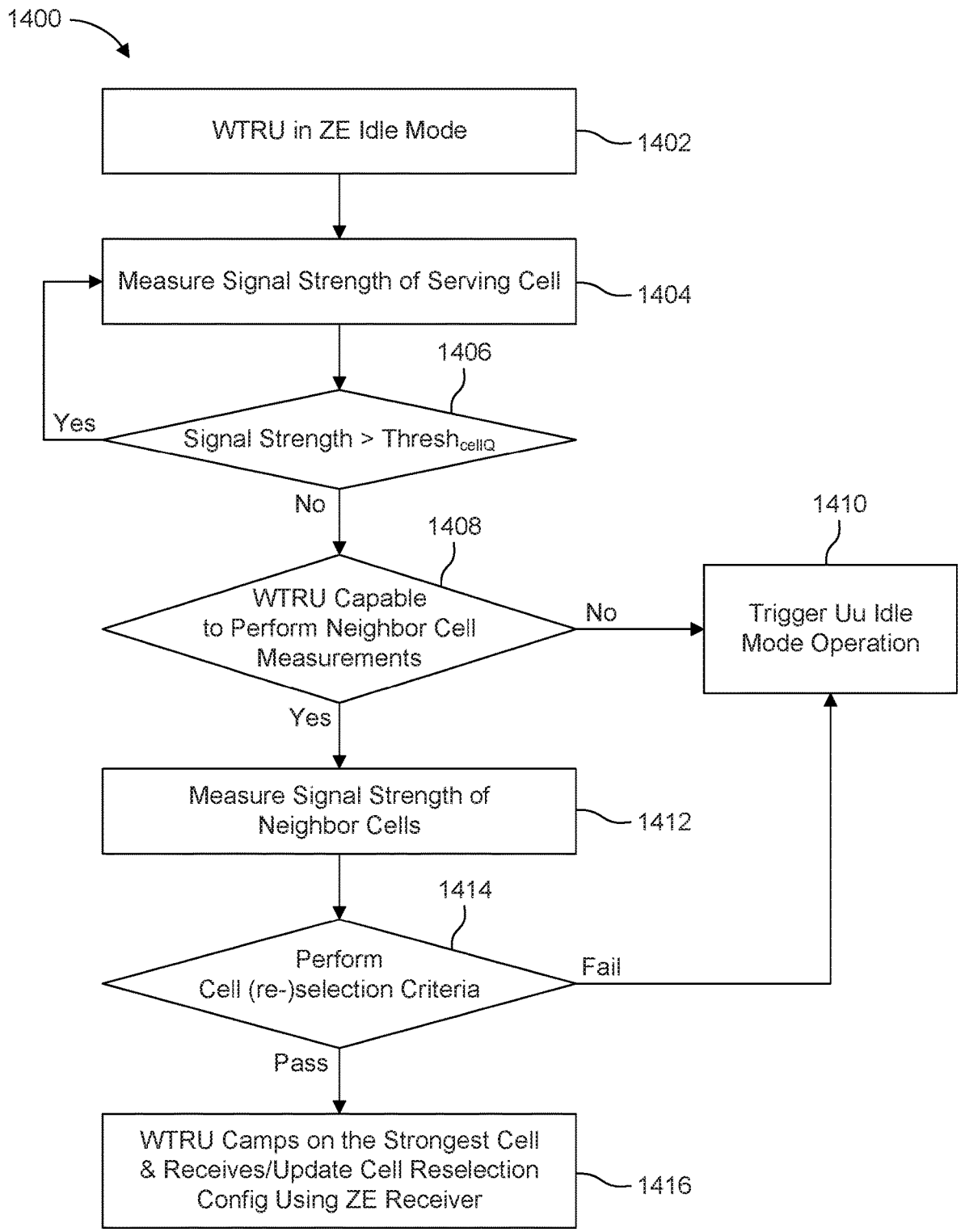
FIG. 14 shows a flow diagram of an example ZE idle mode cell (re-)selection procedure.

Cell selection and reselection procedures may be performed by a passive receiver, according to the disclosures herein. A WTRU with a passive receiver, in passive receiver idle mode, may perform cell selection/reselection based on cell measurements that the WTRU will conduct using any one or more of the ZE measurement reference signals described herein. FIG. 14 shows a flow diagram of an example ZE idle mode cell (re-)selection procedure 1400, that may be performed by a WTRU with a passive receiver. At 1402, the WTRU may be in ZE idle mode (i.e., in ZE mode during idle mode with cellular transceiver turned off). At 1404, the WTRU may measure the signal strength of its own serving cell. At 1406, the WTRU may determine if the signal strength is greater than a cell quality threshold ($Thresh_{cellQ}$). If the signal strength is greater than a cell quality threshold, then the passive receiver may continue to monitor and measure the serving cell, 1404. If the serving cell signal strength falls below the cell quality threshold ($Thresh_{cellQ}$), then at 1408 the WTRU may determine its capability to monitor neighboring cell (i.e., perform neighbor cell measurements). If the WTRU is capable of monitoring neighboring cells, then at 1412 the WTRU may measure the signals strength of neighboring cells. If the passive receiver is used to perform neighboring cells measurements, then at 1414 the WTRU may use the recorded measurements to evaluate cell (re-)selection criteria. If the WTRU finds a suitable cell after cell (re)selection criteria evaluation using the passive receiver, then at 1416 the WTRU selects the best new cell to camp on (e.g., in terms of the neighbor cell with strongest signals) and receives and/or updates the cell reselection configuration using the passive (ZE) receiver. If the WTRU fails to find a suitable cell after cell (re)selection criteria evaluation (1414), or if the WTRU determines that it does not have the capability to monitor neighboring cells (1408), then at 1410 the WTRU may trigger Uu idle mode operations, thereby activating the WTRU's cellular transceiver in idle mode.

Figure 15:
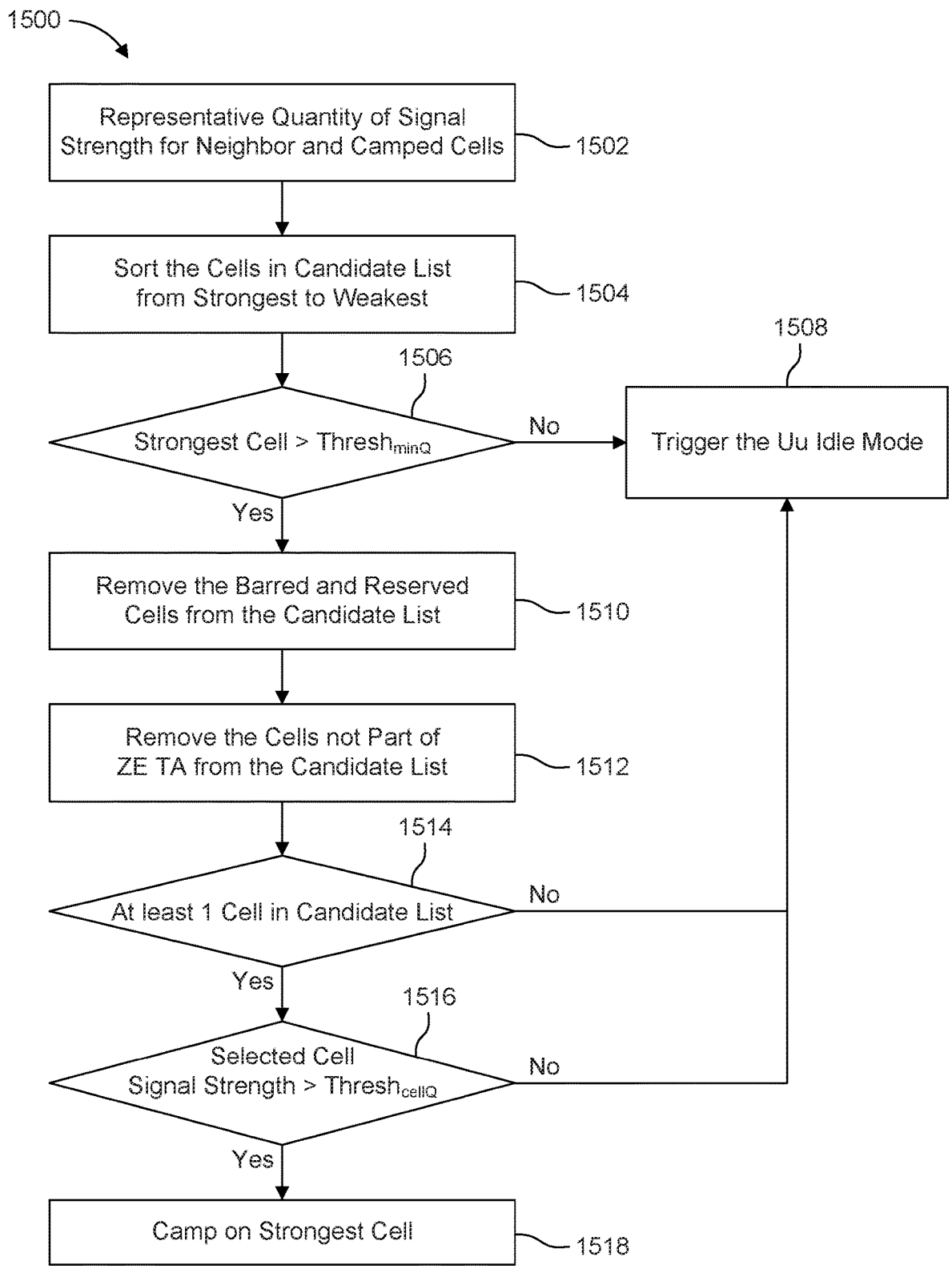
FIG. 15 shows a flow diagram of another example ZE idle mode cell (re-)selection procedure.

FIG. 15 shows a flow diagram of an example ZE idle mode cell (re-)selection procedure 1500 base on the passive receiver, that may be performed by a WTRU with a passive receiver. As illustrated in FIG. 15, the WTRU may perform cell (re-)selection decision based on example cell (re-) selection criteria when using the passive receiver for serving and neighboring cells' signal strength measurements. It may be assumed, for the example ZE idle mode cell (re-)selection procedure 1500, that any one or more of the following transmission characteristics associated with a ZE reference signal waveform, or one or more of its ZE waveform parts, may be known to the passive receiver while processing ZE reference signals from neighboring/camped cells: thresholds for cell quality that may be used to determine if the cell is good to be camped on or to determine if serving cell is good to remain camped on; a minimum threshold that signal strength of different cells have to satisfy to be considered for cell (re-)selection criteria; a list of barred cells, reserved cells and/or restricted cells for operator use; knowledge of cells associated with the tracking area (TA) of the ZE reference signal; a neighbor cell list; and/or offsets and hysteresis value(s) associated with mobility or energy leakage factors. The WTRU with a passive receiver may process an instance of a transmitted ZE reference signal assuming a well-determined transmission format with known transmission characteristics (e.g., energy signature, energy-based thresholding sequence). The WTRU may determine the Rx level of a ZE reference signal based on the observed rate of change in energy accumulation or rate of change between energy transfer events (clicks) when processing a ZE signaling waveform. The WTRU may determine the cell identity from which it is receiving the ZE reference signal by decoding/receiving the cell identity embedded/transmitted with the ZE reference signal. The WTRU may determine equivalent observed RSRP level(s) for DL cellular RSRP measurement(s) for serving cells and/or neighboring cells based on the Rx level from a ZE reference signal and utilize it for cell (re-)selection criteria evaluation.

According to the example ZE idle mode cell (re-)selection procedure 1500 of FIG. 15, at 1502, the WTRU may determine a representative quantity of signal strength for neighbor cells and camped cells. At 1504, the WTRU may sort the neighbor/camped cells in a candidate list in decreasing order of signal strength, which may be used for cell (re-)selection. At 1506, the WTRU may determine if the neighbor or camped cell with the strongest signal strength has a signal strength above a minimum threshold ($Thresh_{minQ}$). If a neighbor or camped cell in the candidate list has a signal strength above the minimum threshold ($Thresh_{minQ}$), then at 1510, the WTRU may remove barred and reserved cells from the candidate list. At 1512, the WTRU may further remove cells that are not part of the ZE reference signal tracking area (TA) from the candidate list. At 1514, it is determined if at least one cell remains in the candidate list. If at least one cell remains in the candidate list, then at 1516, the WTRU may determine if the remaining selected cell from the candidate list (with greatest signal strength) has a signal strength is greater than a cell quality threshold ($Thresh_{cellQ}$). If the signal strength is greater than a cell quality threshold, then the WTRU may camp on the selected cell (with strongest signal strength). If the remaining selected cell does not have signal strength is greater than a cell quality threshold (1516), or if no cells remain in the candidate list (1514), or if none of the neighbor or camped cells have a signal strength above the minimum threshold ($Thresh_{minQ}$) (1506), then at 1508 the WTRU may trigger Uu idle mode operations, thereby activating the WTRU's cellular transceiver in idle mode.

Any of the following example procedures may be used for a WTRU with pass receiver operating in idle mode to fallback from the ZE air interface to the Uu interface (by turning on its main transceiver). As described herein, ZE idle mode operation may imply that the WTRU is in idle mode with its main transceiver turned off and monitoring the ZE air interface, and Uu idle mode operation may imply that the WTRU is in idle mode with its main transceiver (PCR) turned on.

Figure 16:
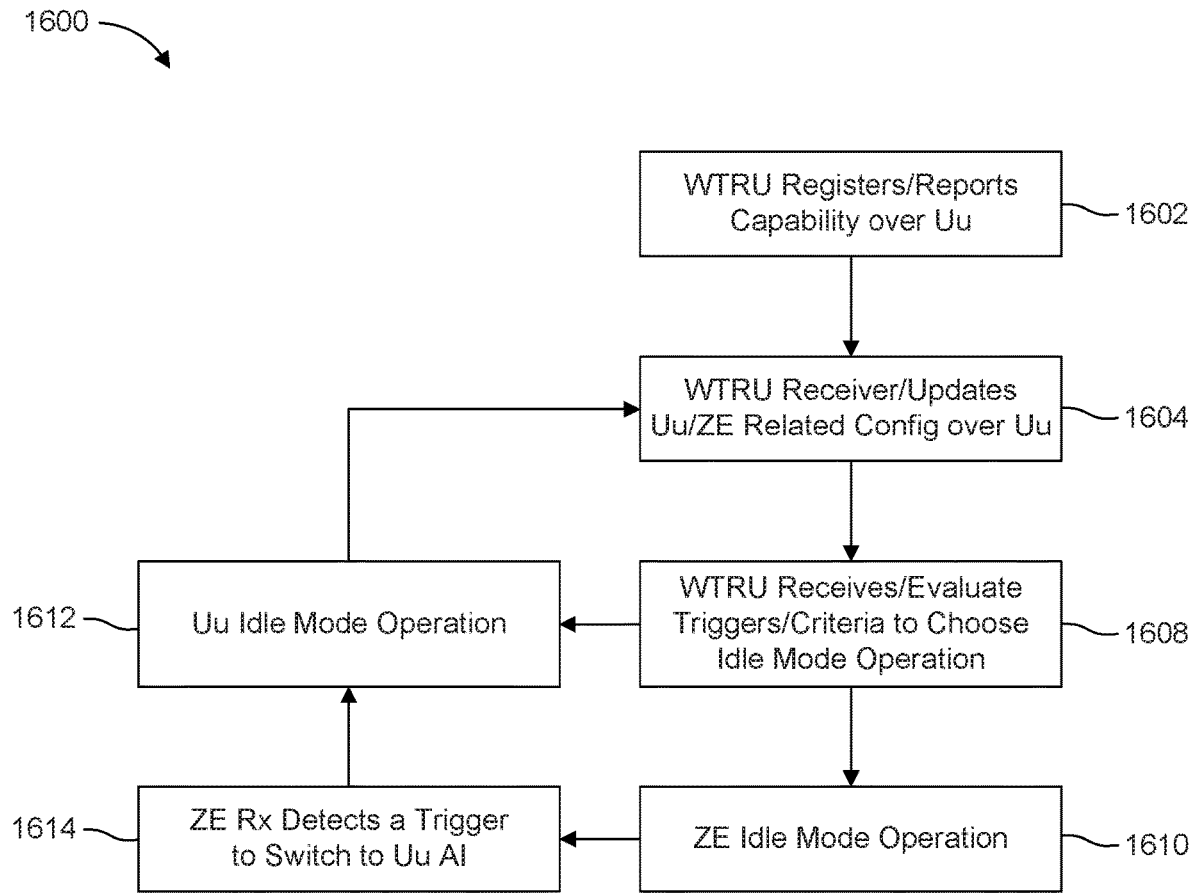
FIG. 16 shows a flow diagram of an example ZE-AI to Uu-AI fallback procedure for a WTRU operating in idle mode with Uu/ZE air interface support.

A WTRU equipped with a passive receiver may choose to use passive receiver for idle mode operations/procedures (e.g., cell (re-)selection procedures) over a ZE air interface instead of using the main cellular transceiver over a Uu air interface in order to conserve battery power. While operating in ZE idle mode using the passive receiver, the WTRU may determine/detect a trigger that can signify the inability of the passive receiver to perform the required idle mode operations/procedures. Example triggers and criteria are described below. Based on the trigger, the WTRU may decide to fallback to idle mode operations using the main transceiver over the Uu air interface (AI), thus turning on its main transceiver. FIG. 16 shows a flow diagram of an example ZE-AI to Uu-AI fallback procedure 1600 for a WTRU operating in idle mode with Uu/ZE air interface support. FIG. 16 illustrates an example interaction between the ZE (passive receiver) air interface and the Uu (main transceiver) air interface for WTRU operations in idle/inactive mode. At 1602, the WTRU operating in Uu idle mode, may register with the network and report its capabilities to the network over the Uu interface. At 1604, the WTRU may receive Uu AI and/or ZE AI related configuration updates over the Uu AI. At 1608, the WTRU may check for triggers or trigger indications to enter ZE idle mode (using only the passive receiver over the ZE air interface) and/or may evaluate network configurations for ZE idle mode operation criteria. Based on the triggers and/or criteria, the WTRU may, at 1610, enter ZE idle mode operation over either the ZE air interface or, at 1612, continue idle mode operation over the Uu air interface. At 1614, the WTRU while operating over the ZE air interface in ZE idle mode may continue to check for triggers (or trigger indications) to switch to idle mode operation over the Uu air interface (1612). While in Uu idle mode, the WTRU may continue to receive Uu and/or ZE AI configuration updates (1604).

Figure 17:
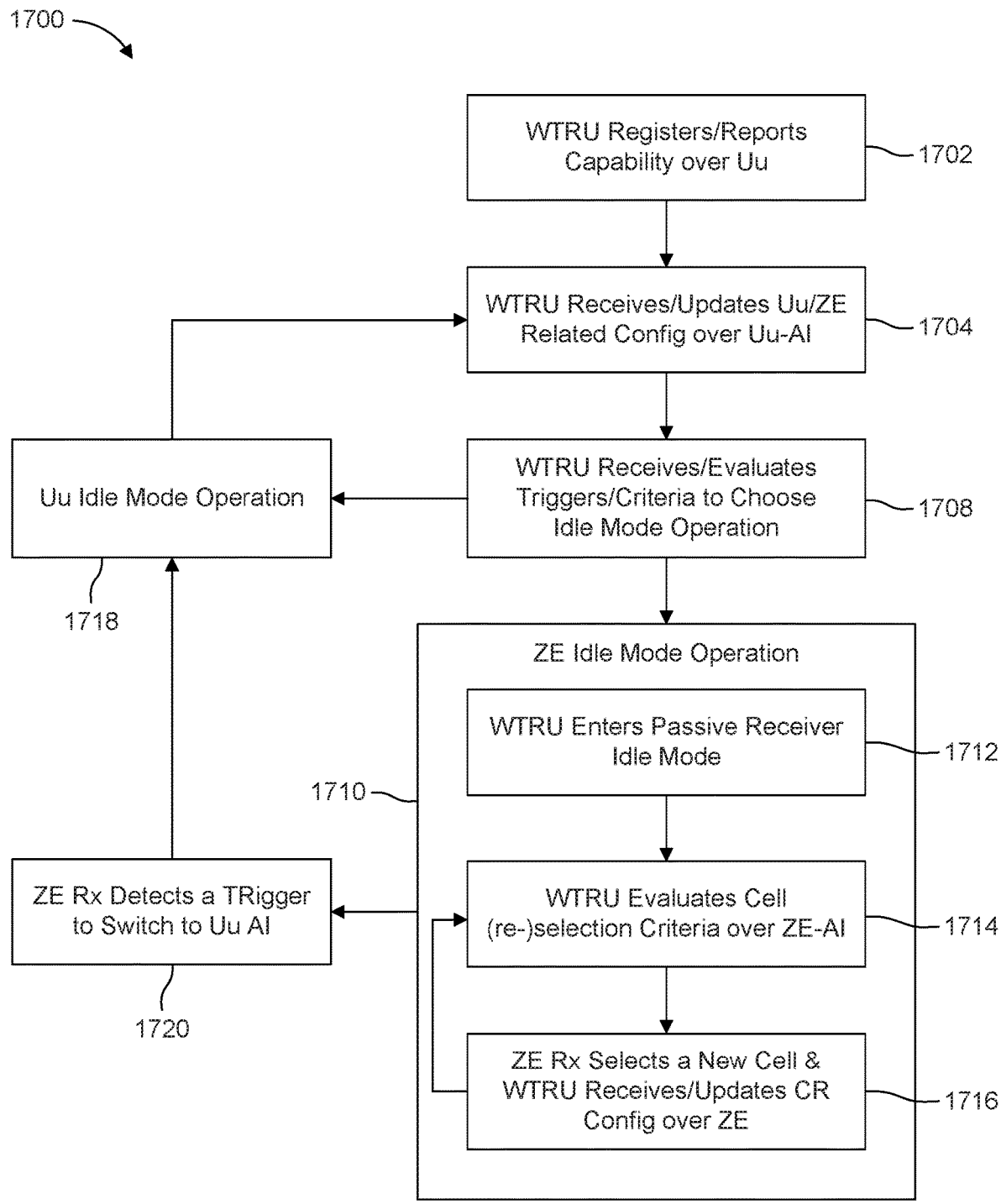
FIG. 17 shows a flow diagram of another example ZE-AI to Uu-AI fallback procedure for a WTRU operating in idle mode with Uu/ZE air interface support.

FIG. 17 shows a flow diagram of another example ZE-AI to Uu-AI fallback procedure 1700 for a WTRU operating in idle mode with Uu/ZE air interface support. At 1702, the WTRU operating in Uu idle mode, may register with the network and report its capabilities to the network over the Uu interface. At 1704, the WTRU may receive Uu AI and/or ZE AI related configuration and/or updates over the Uu AI. At 1708, the WTRU may check for triggers or trigger indications to enter ZE idle mode (using only the passive receiver over the ZE air interface) and/or may evaluate network configurations for ZE idle mode operation criteria. Based on the triggers and criteria, the WTRU may, at 1710, enter ZE idle mode operation over either the ZE air interface or, at 1718, continue idle mode operation over the Uu air interface. During ZE idle mode operation, 1710, the WTRU, at 1712, may enter passive receiver idle mode by turning off its main transceiver. During ZE idle mode operation, 1710, the WTRU, at 1714, may evaluate cell (re-)selection criteria over the ZE-AI. During ZE idle mode operation, 1710, the WTRU using its ZE receiver may, at 1716, select a new cell to camp on and the WTRU may receive and updates cell reselection (CR) configuration over the ZE AI. At 1720, the WTRU while operating over the ZE air interface in ZE idle mode may continue to check for triggers (or trigger indications) to switch (fallback) to idle mode operation over the Uu air interface (1718). While in Uu idle mode, the WTRU may continue to receive Uu and/or ZE AI configuration updates (1704).

A WTRU equipped with a capable passive receiver may choose to initiate a transition OR fallback procedure from the ZE air interface to Uu air interface based on any one or more of the following example triggers or criteria. According to an example trigger/criteria, a WTRU may receive common control signaling message (e.g., a system information update message) indicating the inability of the current serving cell to support idle mode operations over the ZE air interface (e.g., due to limited availability of resources) and requesting WTRUs that are currently utilizing their passive receiver for idle mode operations to wake up their main transceiver and initiate idle mode operations over the Uu air interface. The WTRU may then perform idle mode operations over the Uu air interface after the expiry of a hysteresis/offset timer $T_{off,t}$. The timer value may be signaled as part of the air interface request message and/or may be associated with a specific cell, tracking area, or notification area. The WTRU may decide not to switch to idle mode operations over the Uu air interface if the WTRU detects a new serving cell, tracking area, or notification area before the expiry of the $T_{off,t}$ timer.

According to another example trigger/criteria, a WTRU may receive a common control message, over the ZE air interface, that specifies a battery level threshold and/or a hysteresis value, above which the WTRU should consider switching idle mode operations from the ZE air interface to Uu air interface, potentially to limit the number of devices unnecessarily operating over the ZE air interface. The threshold and hysteresis values may also be preconfigured or internally defined by the WTRU, potentially to improve the overall user experience. The WTRU may then monitor its battery level and compare it to the provided/defined threshold and/or hysteresis values and switch between idle mode operations over the ZE and Uu air interfaces, accordingly.

According to another example trigger/criteria, a WTRU operating in idle mode using the passive receiver over the ZE air interface may keep track of the signal strength of the current serving cell. The WTRU may then detect the serving cell signal strength falling below a specific threshold $H_{serv,p}$ for a specified period of time $T_{serv,p}$, such that the threshold and timer values may be preconfigured at the WTRU and/or dynamically signaled/configured by the network. The WTRU may then decide to either switch to idle mode operation over the Uu air interface (because the current serving cell cannot support WTRU's operation in idle mode over the ZE air interface) or select a new cell based on network configurations (i.e. cell (re-)selection criteria and parameters). In an example, the WTRU may decide to switch directly to idle mode operation over the Uu air interface due to the WTRU's failure to detect a cell satisfying the ZE cell (re-)selection criteria (e.g., cell is barred, reserved, or restricted for ZE air interface access).

According to another example trigger/criteria, a WTRU performing a cell (re-)selection procedure over the ZE air interface may detect a cell identifier that does not belong to a list of identifiers that is preconfigured at the WTRU when the main transceiver was active over the Uu air interface or dynamically updated/signaled by the network over the ZE air interface. In an example, the WTRU may detect a cell, a tracking area, or a notification area identifier that is different than a preconfigured or dynamically signaled identifier (or set thereof) of either a cell, tracking area, or notification area. The WTRU may then, in a next step, determine that the WTRU needs to update its location in the network and/or the newly detected cell, tracking area, or notification area does not support idle mode operation over the ZE air interface. The WTRU may then wake up the main transceiver and initiate idle mode operations over the Uu air interface.

According to another example trigger/criteria, a WTRU may first enter idle mode using the passive receiver over the ZE air interface and initialize a validity timer $T_{ZE,valid}$ that is preconfigured at the WTRU or dynamically signaled/configured by the network. The WTRU may then wake up the main transceiver and initiate idle mode operations over the Uu air interface at the expiry of the validity timer. The purpose of the timer is to limit WTRU's idle/inactive mode operation using the passive receiver over the ZE air interface and/or periodically update the network with the passive receiver status.

According to another example trigger/criteria, a WTRU performing idle mode operations/procedures using a passive receiver over the ZE air interface may fail to detect a ZE signal, identified by a specific transmission format, for a total period of time defined by a failure timer $T_{ZE-RS,period}$. In an example, the WTRU may fail to detect a ZE signal, identified by a specific schedule, for a number $N_{ZE-RS,inst}$ of consecutive time instances. For example, the ZE signal may be a notification message (e.g. paging message), or a measurement reference signal. The failure timer $T_{ZE-RS,period}$ and number of failure instances $N_{ZE-RS,inst}$ may be preconfigured at the WTRU or dynamically signaled/configured by the network.

According to another example trigger/criteria, a WTRU may depend on harvested energy to perform idle mode operations using the passive receiver over the ZE air interface. When considering harvested energy to decide on idle mode operations, the WTRU may perform any one or more of the following steps. The WTRU may detect a harvested energy charging rate over a specified period $T_{EH,period}$ that is less than a specified threshold $H_{EH,rate}$. In an example, the WTRU may detect a harvested energy efficiency, associated with the reception of a signal/POW/preamble of known format or characteristics, that is less than a specified threshold $\eta_{EH,eff}$ that may be defined internally, preconfigured at the WTRU, or dynamically signaled/configured by the network. Then, the WTRU may determine that there is an undesired mismatch between the accumulated/harvested charge over a duration $T_{EH,eval}$ and the consumed energy for idle/inactive mode operations support over the same duration (i.e. the amount of charge/energy harvested is not enough to sustain the WTRU's idle/inactive mode operations over the ZE air interface). In this case, the WTRU may decide to limit idle mode operations over the ZE air interface to reduce power consumption requirements. The WTRU may evaluate a trade-off metric between the passive receiver and main transceiver operations in idle mode, for example by evaluating the overall power consumption and/or idle mode operations performance. The WTRU may compare the evaluated trade-off metric against a threshold $H_{ZE-Uu,trade-off}$ preconfigured at the WTRU or dynamically signaled/configured by the network. In an example, the WTRU may determine if the passive receiver can have access to the WTRU's main battery (i.e. the battery used by the main transceiver), or is restricted to a limited battery/capacitor that requires RF energy to charge. Based on any of the triggers or criteria described above, the WTRU may decide to continue idle mode operations over the ZE air interface if the trade-off metric is above the specified threshold, or the WTRU may decide to wake up the main transceiver and initiate idle mode operations over the Uu air interface.

Figure 18:
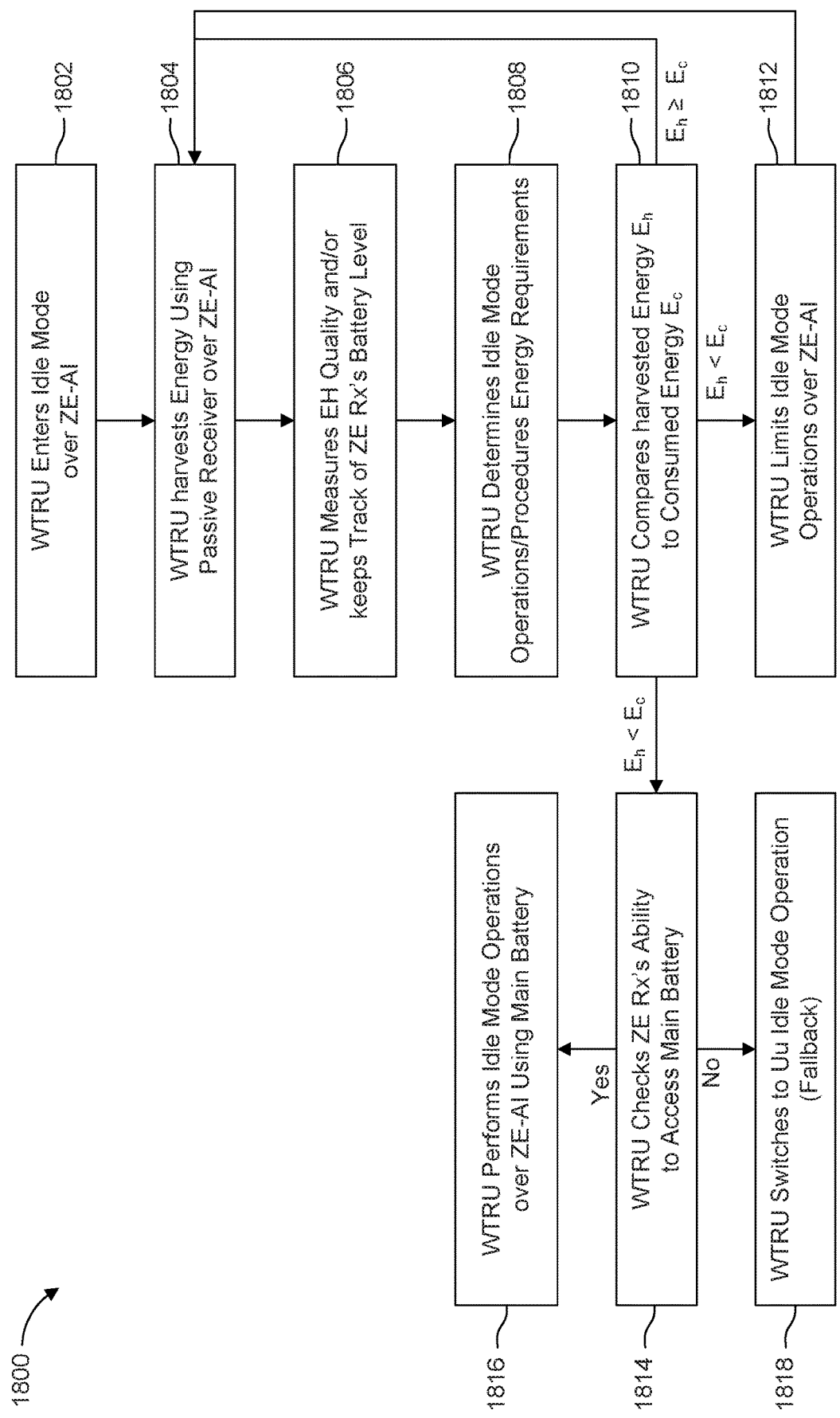
FIG. 18 shows a flow diagram of an example of an idle mode operation decision procedure.

FIG. 18 shows a flow diagram of an example idle mode operation decision procedure 1800, performed by a WTRU with a passive receiver. The example idle mode operation decision procedure 1800 may be used by the WTRU to determine when to switch between (or fallback to) ZE idle mode operation with the main transceiver turned off and Uu idle mode operation with the main transceiver turned on. At 1802, the WTRU may enter ZE idle mode operation over the ZE-AI (and with the main transceiver turned off). At 1804, the WTRU may harvest energy using the passive (ZE) receiver over the ZE-AI. At 1806, the WTRU may measure the energy harvested (EH) quality and/or may monitor the ZE receiver's battery level. At 1808, the WTRU may determine the energy requirements for idle mode operation and procedure (e.g., cell (re-)selection procedures), based on parameters and criteria described above. At 1810, the WTRU may compare the energy harvested $E_h$ to the energy consumed $E_c$ in ZE idle mode operation. If the energy harvested $E_h$ exceeds the energy consumed $E_c$, then the WTRU may decide to remain in ZE idle mode operation (e.g., return to 1804). If the energy harvested $E_h$ is below the energy consumed $E_c$, (implying that the battery level will reduce over time in ZE idle mode because energy is being consumed faster than it is being harvested), may decide between one of the following: at 1812, the WTRU may decide to remain in ZE idle mode but limit idle mode operations over the ZE-AI; or, the WTRU, at 1814, may additionally check the ZE receiver to access the main battery. For example, the WTRU may limit idle mode operations by reducing the measurement frequency at the expense of measurement quality, and/or by employing duty-cycled paging reception instead of on-demand paging reception. If the WTRU has access to the main WTRU battery, at 1816, the WTRU may continue to perform ZE idle mode operations over the ZE-AI (without turning on the main transceiver) and using the main battery. If the WTRU does not have access to the main WTRU battery, at 1818, the WTRU may switch/fallback to Uu idle mode operation and turn on its main transceiver.

In an example, a WTRU may conserve battery power by deciding to continue idle mode operations over the ZE air interface as long as the WTRU is operating energy efficiently and a performance trade-off metric is above a specified threshold; otherwise, the WTRU by wake up or turn on its main transceiver and initiate idle mode operations over the Uu air interface.

Figure 19:
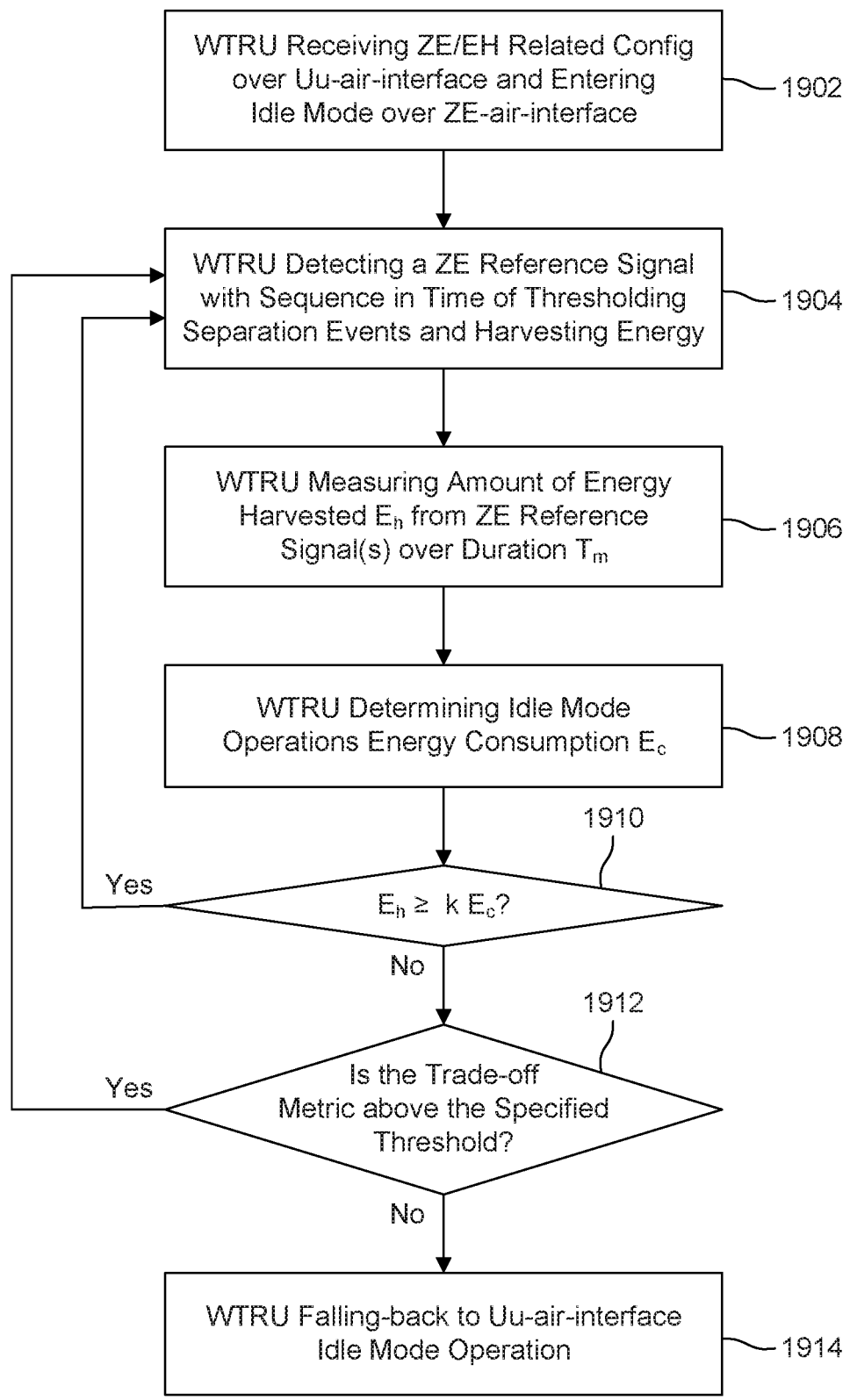
FIG. 19 shows a flow diagram of an example of another idle mode operation decision procedure.

FIG. 19 shows a flow diagram of an example of another idle mode operation decision procedure 1900, performed by a WTRU with a passive receiver. The example idle mode operation decision procedure 1900 may be used by the WTRU to determine when to switch between (or fallback to) ZE idle mode operation with the main transceiver turned off and Uu idle mode operation with the main transceiver turned on. At 1902, the WTRU may receive energy harvesting (EH) related configuration information, for example for cell (re-) selection operation over the ZE-AI, and may enter ZE idle mode operation over the ZE-AI, turning off the main transceiver. At 1904, the WTRU may detect ZE reference signal (s) over the ZE-AI (e.g., (transmitted by the eNB), for example based on the sequence in time of energy accumulation events (e.g., using an energy profile or signature such as number, distribution or separation of thresholding events) and may harvest energy from the ZE reference signal(s). At 1906, the WTRU may measure the amount of energy harvested $E_h$, utilizing the received ZE reference signal(s), over a specified duration $T_m$. At 1908, the WTRU may determine the amount of energy consumed $E_c$ during the same specified duration or period $T_m$ while supporting ZE idle mode operations. At 1910, the WTRU may compare the energy harvested $E_h$ to the energy consumed $E_c$ in ZE idle mode operation. If the energy harvested $E_h$ exceeds the energy consumed $E_c$, then the WTRU may decide to remain in ZE idle mode operation (e.g., return to 1904). If the energy harvested $E_h$ is below the energy consumed $E_c$, (implying that the battery level will reduce over time in ZE idle mode because energy is being consumed faster than it is being harvested), the WTRU, at 1912, may evaluate an operation trade-off metric (e.g., any of the examples operation trade-off metric described herein). This evaluation may be based on overall energy consumption and/or WTRU performance against a threshold $H_{ZE\text{-}Uu,\ trade\text{-}off}$ (e.g., the threshold $H_{ZE\text{-}Uu,\ trade\text{-}off}$ may be signaled to the WTRU or preconfigured at the WTRU). If the trade-off metric is determined to be below the specified threshold, the WTRU, at 1914, may switch (fallback) to the Uu air-interface and initiate Uu-AI idle mode operation, which includes turning on the main transceiver.). If the trade-off metric is determined to be above the specified threshold, the WTRU may remain in ZE idle mode operation (e.g., return to 1904).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
   a main transceiver;
   a zero-energy (ZE) receiver; and
   a processor, wherein
   the main transceiver and the processor are configured to:
      receive, over a Uu interface, information indicating an energy harvesting (EH) configuration for use over a ZE air interface; and
      turn off the main transceiver;
   the ZE receiver and the processor are configured to:
      in accordance with the EH configuration, harvest energy from ZE signals detected over the ZE air interface, wherein each of the ZE signals includes a power-optimized waveform (POW) part and an information bearing part, and wherein the energy is harvested based on the POW part; and
      on a condition that an energy consumption over a first time period is greater than an amount of the harvested energy over the first time period and a measured performance value is greater than a first threshold, continue harvesting energy from ZE signals detected over the ZE air interface.

2. The WTRU of claim 1, wherein the ZE receiver and the processor are configured to, on a condition that the energy consumption over the first time period is less than the amount of the harvested energy over the first time period, continue harvesting energy from ZE signals detected over the ZE air interface.

3. The WTRU of claim 1, wherein the ZE receiver and the processor are configured to, on a condition that the energy consumption over the first time period is greater than the amount of the harvested energy over the first time period and the ZE receiver has access to a battery, continue harvesting energy from ZE signals detected over the ZE air interface.

4. The WTRU of claim 1, wherein the information bearing part comprises at least a sequence, and wherein the ZE receiver and the processor are configured to harvest energy from each of the ZE signals based on the information bearing part.

5. The WTRU of claim 1, wherein the ZE receiver and the processor are further configured to, in accordance with the EH configuration, perform cell selection and cell re-selection procedures over the ZE air interface.

6. The WTRU of claim 5, wherein, as part of the cell selection and cell re-selection procedures,
   the ZE receiver and the processor are configured to:
      measure signal strength of signals from a serving cell; and
      on a condition that the signal strength of the signals from the serving cell is below a first threshold, measure signal strength of signals from a plurality of neighboring cells, select a cell from the plurality of neighboring cells based on cell selection and reselection criteria, and camp on the selected cell.

7. The WTRU of claim 1, wherein the ZE receiver and the processor are configured to detect the ZE signals for the energy harvesting based on a sequence in time of energy accumulation events using an energy profile or signature.

8. A method, performed by a wireless transmit/receive unit (WTRU), the method comprising:
   receiving, by a main transceiver, over a Uu interface, information indicating an energy harvesting (EH) configuration for use over a zero-energy (ZE) air interface;
   turning off the main transceiver;
   in accordance with the EH configuration, harvesting, by a ZE receiver, energy from ZE signals detected over the ZE air interface, wherein each of the ZE signals include at least a power-optimized waveform (POW) part and an information bearing part, and wherein the energy is harvested based on the POW part; and
   on a condition that an energy consumption over a first time period is greater than an amount of the harvested energy over the first time period and a measured performance value is greater than a first threshold, continuing harvesting energy from ZE signals detected over the ZE air interface.

9. The method of claim 8, further comprising, on a condition that the energy consumption over the first time period is less than the amount of the harvested energy over the first time period, continuing harvesting, by the ZE receiver, energy from ZE signals detected over the ZE air interface.

10. The method of claim 8, further comprising, on a condition that the energy consumption over the first time period is greater than the amount of the harvested energy over the first time period and the ZE receiver has access to a battery, continuing harvesting, by the ZE receiver, energy from ZE signals detected over the ZE air interface.

11. The method of claim 8, wherein the information bearing part comprises at least a sequence, and wherein the energy is harvested from each of the ZE signals based on the information bearing part.

12. The method of claim 8, further comprising, in accordance with the EH configuration, performing cell selection and cell re-selection procedures over the ZE air interface.

13. The method of claim 12, further comprising, as part of the cell selection and cell re-selection procedures:
    measuring signal strength of signals from a serving cell; and
    on a condition that the signal strength of the signals from the serving cell is below a first threshold, measuring signal strength of signals from a plurality of neighboring cells, selecting a cell from the plurality of neighboring cells based on cell selection and reselection criteria, and camping on the selected cell.

14. The method of claim 8, wherein the ZE signals are detected based on a sequence in time of energy accumulation events using an energy profile or signature.

* * * * *